(12) United States Patent
Finlayson et al.

(10) Patent No.: US 11,118,472 B2
(45) Date of Patent: Sep. 14, 2021

(54) FAN BLADE CONTAINMENT SYSTEM FOR GAS TURBINE ENGINE

(71) Applicant: ROLLS-ROYCE plc, London (GB)

(72) Inventors: James A Finlayson, Ashby-de-la-Zouch (GB); Julian M Reed, Derby (GB)

(73) Assignee: ROLLS-ROYCE plc, London (GB)

( * ) Notice: Subject to any disclaimer, the term of this patent is extended or adjusted under 35 U.S.C. 154(b) by 112 days.

(21) Appl. No.: 16/399,138

(22) Filed: Apr. 30, 2019

(65) Prior Publication Data

US 2020/0123925 A1   Apr. 23, 2020

(30) Foreign Application Priority Data

Oct. 18, 2018  (GB) .................................. 1816989.6

(51) Int. Cl.
*F01D 25/04* (2006.01)
*F01D 21/04* (2006.01)
*F01D 25/24* (2006.01)

(52) U.S. Cl.
CPC .......... *F01D 21/045* (2013.01); *F01D 25/24* (2013.01); *F05D 2240/14* (2013.01); *F05D 2250/283* (2013.01); *F05D 2300/603* (2013.01)

(58) Field of Classification Search
CPC ...... F01D 21/045; F01D 25/24; F01D 25/243; F01D 25/28; B64C 27/007
See application file for complete search history.

(56) References Cited

U.S. PATENT DOCUMENTS

| | | | | |
|---|---|---|---|---|
| 4,452,563 A | * | 6/1984 | Belanger | F01D 21/045 415/9 |
| 4,452,565 A | * | 6/1984 | Monhardt | F01D 21/045 415/9 |
| 4,475,864 A | * | 10/1984 | Patacca | F01D 21/045 415/9 |
| 4,484,856 A | * | 11/1984 | Patacca | F01D 21/045 415/9 |
| 4,490,092 A | * | 12/1984 | Premont | F01D 21/045 415/1 |
| 4,500,252 A | * | 2/1985 | Monhardt | F01D 21/045 138/110 |
| 4,503,104 A | * | 3/1985 | Belanger | F01D 21/045 428/34.1 |
| 4,598,449 A | * | 7/1986 | Monhardt | F01D 21/045 219/121.13 |
| 4,648,795 A | * | 3/1987 | Lardellier | F01D 21/045 415/173.4 |

(Continued)

FOREIGN PATENT DOCUMENTS

EP   1 860 283 A2   11/2007
EP   2 620 652 A1    7/2013

(Continued)

*Primary Examiner* — Woody A Lee, Jr.
*Assistant Examiner* — Behnoush Haghighian
(74) *Attorney, Agent, or Firm* — Oliff PLC

(57) ABSTRACT

A fan blade containment system is arranged to surround a fan including a plurality of fan blades in a gas turbine engine for an aircraft. The fan blade containment system includes a composite fan case arranged to surround the fan; and a metallic insert mounted on the composite fan case and including a metallic hook arranged to prevent forward debris release should all or part of a fan blade become detached from the fan.

28 Claims, 10 Drawing Sheets

(56) References Cited

U.S. PATENT DOCUMENTS

| | | | | |
|---|---|---|---|---|
| 4,718,818 A * | 1/1988 | Premont | | F01D 21/045 415/9 |
| 4,934,899 A * | 6/1990 | Patacca | | F02C 7/05 415/9 |
| 5,344,280 A * | 9/1994 | Langenbrunner | | F01D 21/045 415/9 |
| 5,408,826 A * | 4/1995 | Stewart | | F01D 21/045 60/226.1 |
| 5,409,349 A * | 4/1995 | Kulak | | F01D 21/045 415/9 |
| 5,413,456 A * | 5/1995 | Kulak | | F01D 21/045 415/9 |
| 5,431,532 A * | 7/1995 | Humke | | F01D 21/045 415/9 |
| 5,482,429 A * | 1/1996 | Penda | | F01D 21/045 415/9 |
| 5,485,723 A * | 1/1996 | McCoy | | F01D 21/045 60/226.1 |
| 5,486,086 A * | 1/1996 | Bellia | | F01D 21/045 415/9 |
| 5,823,739 A * | 10/1998 | Van Duyn | | F01D 21/045 415/9 |
| 6,059,524 A | 5/2000 | Costa et al. | | |
| 6,364,603 B1 * | 4/2002 | Czachor | | F02C 7/04 415/9 |
| 6,575,694 B1 * | 6/2003 | Thompson | | F01D 21/045 415/9 |
| 6,619,913 B2 * | 9/2003 | Czachor | | F01D 21/045 415/119 |
| 6,769,864 B2 * | 8/2004 | Sathianathan | | F01D 21/045 415/200 |
| 7,018,168 B2 * | 3/2006 | Worthoff | | F01D 21/045 415/9 |
| 7,192,243 B2 * | 3/2007 | Lawson | | F01D 21/045 415/9 |
| 7,255,528 B2 * | 8/2007 | Stretton | | F01D 21/045 415/9 |
| 7,766,603 B2 * | 8/2010 | Beckford | | F01D 25/24 415/9 |
| 7,866,939 B2 * | 1/2011 | Harper | | B64D 33/02 415/9 |
| 7,914,251 B2 * | 3/2011 | Pool | | F02K 1/82 415/9 |
| 8,578,697 B2 * | 11/2013 | Harper | | F02K 3/06 60/226.1 |
| 8,672,609 B2 * | 3/2014 | Lussier | | F01D 25/243 415/9 |
| 8,753,075 B2 * | 6/2014 | Rice | | F02K 3/04 415/190 |
| 8,888,439 B2 * | 11/2014 | Harper | | F01D 25/24 415/9 |
| 8,926,263 B2 * | 1/2015 | Reed | | F02K 3/06 415/9 |
| 8,985,506 B2 * | 3/2015 | Vauchel | | B64D 33/02 244/53 B |
| 9,194,299 B2 * | 11/2015 | Alarcon | | F02C 7/32 |
| 9,200,531 B2 * | 12/2015 | Robertson, Jr. | | F01D 11/125 |
| 9,206,706 B2 * | 12/2015 | Evans | | F01D 21/045 |
| 9,222,368 B2 * | 12/2015 | Harper | | F01D 25/243 |
| 9,249,681 B2 * | 2/2016 | Robertson, Jr. | | F01D 11/127 |
| 9,429,039 B2 * | 8/2016 | Finlayson | | F01D 21/045 |
| 9,482,111 B2 * | 11/2016 | Costa | | F01D 21/045 |
| 9,644,493 B2 * | 5/2017 | Clarkson | | F01D 25/24 |
| 9,677,570 B2 * | 6/2017 | Care | | F04D 29/526 |
| 9,683,490 B2 * | 6/2017 | Harper | | F01D 21/04 |
| 9,797,269 B2 * | 10/2017 | Evans | | F01D 25/243 |
| 9,828,876 B2 * | 11/2017 | Kappes | | F01D 25/04 |
| 9,835,046 B2 * | 12/2017 | Reed | | F01D 21/045 |
| 9,915,168 B2 * | 3/2018 | Robertson, Jr. | | F01D 21/045 |
| 9,945,254 B2 * | 4/2018 | Ivakitch | | F01D 11/122 |
| 9,951,645 B2 * | 4/2018 | Evans | | F01D 25/246 |
| 9,957,835 B2 * | 5/2018 | Evans | | F01D 21/045 |
| 10,077,671 B2 * | 9/2018 | Husband | | F01D 5/02 |
| 10,119,421 B2 * | 11/2018 | Hicklin | | F01D 21/045 |
| 10,125,631 B2 * | 11/2018 | Evans | | F01D 21/045 |
| 10,174,633 B2 * | 1/2019 | Hall | | F01D 25/28 |
| 10,180,082 B2 * | 1/2019 | Snyder | | F01D 21/045 |
| 10,221,718 B2 * | 3/2019 | Clarkson | | F01D 25/005 |
| 10,294,794 B2 * | 5/2019 | Reed | | F01D 5/06 |
| 10,443,446 B2 * | 10/2019 | Ivakitch | | F01D 25/005 |
| 10,465,707 B2 * | 11/2019 | Care | | F04D 29/663 |
| 10,480,530 B2 * | 11/2019 | Costa | | F01D 11/122 |
| 2002/0164244 A1 * | 11/2002 | Sathianathan | | F01D 21/045 415/9 |
| 2003/0156940 A1 * | 8/2003 | Czachor | | F02C 7/045 415/119 |
| 2005/0089391 A1 * | 4/2005 | Stretton | | F04D 29/664 415/9 |
| 2008/0069688 A1 * | 3/2008 | Harper | | F02C 7/05 415/196 |
| 2008/0253883 A1 * | 10/2008 | Pool | | F01D 25/24 415/200 |
| 2009/0277153 A1 * | 11/2009 | Harper | | F02K 3/06 60/39.091 |
| 2009/0324390 A1 * | 12/2009 | Harper | | F02C 7/045 415/119 |
| 2010/0320316 A1 * | 12/2010 | Vauchel | | F02C 7/045 244/1 N |
| 2011/0044806 A1 * | 2/2011 | Harper | | F02C 7/05 415/182.1 |
| 2012/0224949 A1 * | 9/2012 | Harper | | F02K 3/06 415/9 |
| 2012/0224958 A1 * | 9/2012 | Reed | | F01D 25/243 415/213.1 |
| 2013/0189095 A1 * | 7/2013 | Harper | | F01D 25/24 415/208.1 |
| 2013/0195635 A1 * | 8/2013 | Robertson, Jr. | | F01D 11/16 415/197 |
| 2013/0302154 A1 * | 11/2013 | Finlayson | | F01D 21/045 415/200 |
| 2014/0064949 A1 * | 3/2014 | Evans | | F01D 25/243 415/208.1 |
| 2014/0072426 A1 * | 3/2014 | Evans | | F01D 25/243 415/213.1 |
| 2014/0173897 A1 * | 6/2014 | Alarcon | | F01D 21/045 29/888.025 |
| 2014/0212273 A1 * | 7/2014 | Le Borgne | | F02K 3/06 415/119 |
| 2015/0139779 A1 * | 5/2015 | Harper | | F02K 3/06 415/9 |
| 2015/0147156 A1 * | 5/2015 | Care | | F01D 25/24 415/9 |
| 2015/0218961 A1 * | 8/2015 | Evans | | F01D 25/243 415/9 |
| 2015/0233262 A1 * | 8/2015 | Reed | | F01D 21/045 415/9 |
| 2015/0308290 A1 * | 10/2015 | Kappes | | F01D 25/24 415/119 |
| 2015/0330255 A1 * | 11/2015 | Alarcon | | F01D 25/28 415/182.1 |
| 2015/0345326 A1 * | 12/2015 | Robertson, Jr. | | F01D 21/045 415/9 |
| 2015/0354408 A1 * | 12/2015 | Snyder | | F01D 25/24 415/196 |
| 2016/0084086 A1 * | 3/2016 | Reed | | F01D 25/24 416/219 R |
| 2016/0169044 A1 * | 6/2016 | Clarkson | | F01D 21/045 415/196 |
| 2016/0177971 A1 * | 6/2016 | Bagnall | | F04D 29/083 415/173.4 |
| 2016/0208640 A1 * | 7/2016 | Drozdz | | F04D 29/526 |
| 2016/0333738 A1 * | 11/2016 | Ivakitch | | F01D 11/14 |
| 2017/0122126 A1 * | 5/2017 | Hall | | B64D 33/02 |

(56) References Cited

U.S. PATENT DOCUMENTS

2018/0187570 A1* 7/2018 Ivakitch ................ F01D 11/122
2019/0063460 A1* 2/2019 Costa .................... F04D 29/023

FOREIGN PATENT DOCUMENTS

| EP | 1 860 283 A3 | 9/2013 |
| EP | 2 876 289 A1 | 5/2015 |
| EP | 3 246 532 A1 | 11/2017 |
| GB | 2 407 343 A | 4/2005 |

* cited by examiner

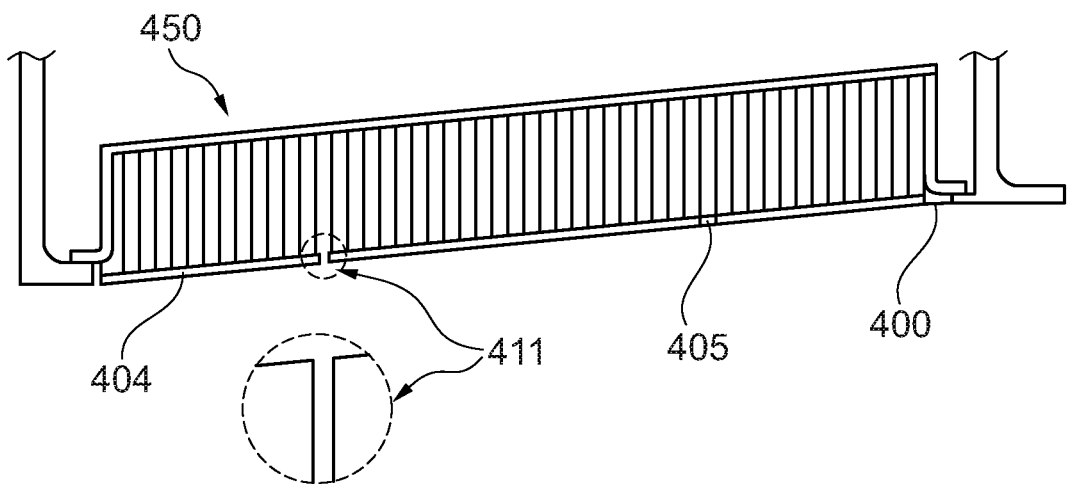
Fig. 17
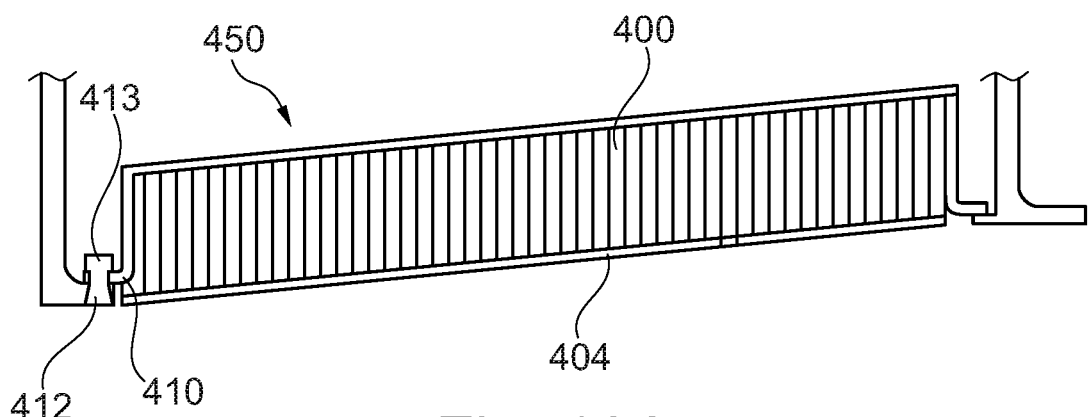
Fig. 18A
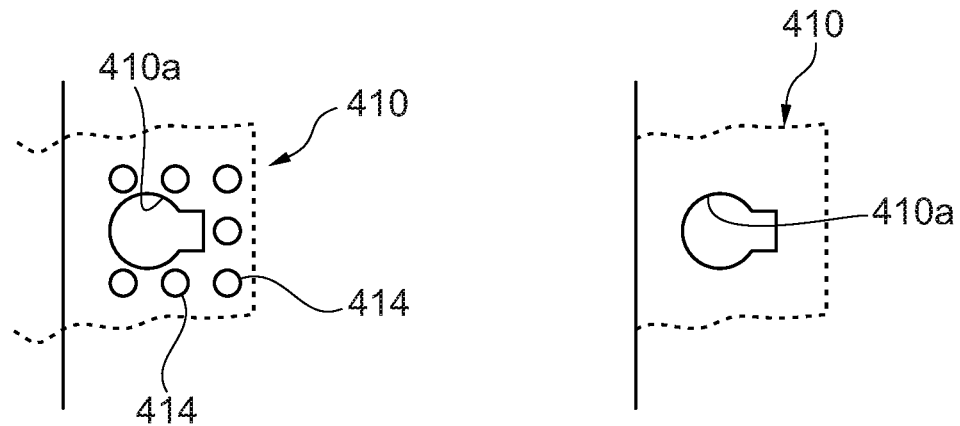
Fig. 18B
Fig. 18C

FAN BLADE CONTAINMENT SYSTEM FOR GAS TURBINE ENGINE

The present disclosure relates to containment of debris generated on fan blade failure within a turbine engine, and more specifically to a debris containment system arranged for use with a composite fan case. The containment system may allow any such debris to be retained within the boundary of the engine. The engine may be a gas turbine engine of an aircraft.

The skilled person will appreciate that gas turbine engines for aircraft are required by regulations to feature a system that contains a fan blade should it fail and be released from the fan rotor. The present disclosure may therefore be of particular utility for aircraft engines. The released fan blade may be referred to as a "released blade" or a "failed blade".

In known examples, the fan containment system may comprise a plain or ribbed metallic casing, or a plain or isogrid Kevlar® wrapped casing. The weight of the fan case assembly may account for between 5 and 10% of the engine weight.

In order to absorb the high energies generated following fan blade failure, the fan case materials are generally selected for high strength and/or high ductility. The fan case generally comprises materials such as aluminium with Kevlar® wrapping, carbon fibre composites, ribbed Armco® or ribbed titanium to withstand the force generated by a released fan blade.

Management of debris generated during the release of a fan blade may reduce the chance of the blade being deflected off the containment system and becoming a potential hazard to the airframe. In particular, forward release of debris is intended to be minimised or avoided.

According to a first aspect, there is provided a fan blade containment system arranged to surround a fan comprising a plurality of fan blades in a gas turbine engine for an aircraft. The fan blade containment system comprises a composite fan case arranged to surround the fan; and a metallic insert mounted on the composite fan case.

The metallic insert comprises a metallic hook. The metallic hook is arranged to prevent forward debris release should all or part of a fan blade become detached from the fan.

Forward axial motion of debris, resulting in forward release, is generally more likely to damage the aircraft than rear axial release.

The skilled person will appreciate that metal can be machined or otherwise shaped to provide specific features, potentially more easily than a composite can be formed into the relevant shapes, and/or with greater strength of the resultant part.

The metallic hook may extend around the circumference of the fan case, so providing a fence with a rearwardly-directed lip (i.e. a direction opposed to the flight direction/towards the back of the engine). The hook may comprise a fence extending inwardly around the inner circumference of the fan case and the rearwardly directed lip may extend from the fence at a radial position spaced from the fan case, for example at or near an inner edge of the fence. In a fan blade-off event, a blade tip or other edge of a failed blade or blade part may be forced under the lip; the hook may therefore arrest forward motion of the blade or blade part.

Embodiments may allow for capturing typical debris generated during fan blade failure events within the boundary of the engine.

The skilled person will appreciate that embodiments of the present disclosure may be of particular utility for part-blade or part-engine speed release conditions that are outside of current containment regulations. In particular, lower speed blades (due to a lower rotor speed on failure) or smaller blade fragments (when a blade is broken part-way along its length) may not strike a lining of a fan case of known examples with sufficient force to pass through the liner and be retained (and may instead bounce off), whereas the hook provided by the present disclosure may capture/arrest forward motion of the blade or blade fragment across a wide range of speeds and sizes. A minimum impact force for the fan containment system to operate may therefore be lower as compared to various known examples.

The ability to capture debris may therefore be insensitive to engine power conditions or blade failure height.

The skilled person will appreciate that use of a metallic insert within the composite fan case may allow the use of hook features which may not be practical to form directly into the composite fan case. The incorporation of one or more hooks may then facilitate the incorporation of trap door liner systems within the fan case, as described below. The trap door(s) may move or break during fan blade interaction and allow engagement of debris into the hooks so that the debris has its forward motion arrested, and optionally is captured.

The metallic insert may be arranged to be mounted on the fan case so as to extend forward of a forward edge of the fan case. In such embodiments, the metallic insert may comprise an outwardly-directed lip at its forward edge, so providing a front flange. The skilled person will appreciate that a front flange of a composite fan case may be a relatively weak point, and that replacing or reinforcing the composite front flange with a front flange of the metallic insert may improve strength.

In embodiments in which the composite fan case and the metallic insert both comprise a front flange, the front flange of the metallic insert may be arranged to lie against and in front of the composite front flange. The front flange of the metallic insert may serve to facilitate alignment of the metallic insert with the fan case for mounting.

The metallic insert may be mounted on the composite fan case by means of an adhesive layer. The type of adhesive and/or adhesive thickness may be selected to allow for different thermal expansions of the metallic insert and the fan case. The adhesive layer may account for differences in the Coefficients of Thermal Expansion between the metallic insert and the composite fan case. One or more through-case fasteners (e.g. bolts) may be used in addition to, or instead of, the adhesive. The fasteners may be arranged to accommodate some relative expansion/contraction of the insert and fan case.

The metallic insert may comprise only the one (first) metallic hook (i.e. there may be no second hook).

The first metallic hook may be arranged to be located adjacent to and forward of the fan blade tips (an aft hook). The skilled person will appreciate that this position may facilitate release blade capture (i.e. capture/arrest of forward movement of a first blade to be damaged/released). The metallic hook may be located a set distance in front of the fan blades. The set distance may be determined based on blade shape and height, amongst other factors.

The skilled person will appreciate that the first hook may be positioned anywhere between the leading edge tip position to, for example, five to fifteen centimetres forward of this (depending on engine size), dependent on several attributes such as blade span, chord and blade shape and the maximum, minimum and/or typical speed(s) of the fan. The first hook may be located near/adjacent and forward of the fan, and more particularly near/adjacent and forward of the leading edge tip of the fan.

The first metallic hook may be arranged to be located further forward (a fore hook), spaced from the fan blade tips, for example being at or adjacent a forward edge of the fan case. The skilled person will appreciate that this position may facilitate trailing blade capture (i.e. capture/arrest of forward movement of a second or further blade, impacted by the release blade or a previously-released trailing blade). The skilled person will appreciate that typical impact angles and how the blades are seated mean that trailing blades usually travel further forwards, hence a forward hook location may be better suited to capturing trailing blades/blade parts. The forward hook location may be suited to capturing metalwork, e.g. leading edge metalwork, peeled off composite blades. The metallic hook may be located a set distance in front of the fan blades. The set distance may be determined based on blade shape and how metalwork is bonded to the blade, amongst other factors.

In alternative embodiments, the metallic insert may comprise two metallic hooks. The second metallic hook may be a fore hook (e.g. for trailing blade debris), and may be located forward of the first metallic hook, which may be an aft hook (e.g. for release blade debris).

Each metallic hook may be arranged to prevent forward debris release should all or part of a fan blade become detached from the fan. The first, aft, hook may be arranged for release blade/blade-part capture and the second, fore, hook may be arranged for trailing blade/blade-part capture. The captured blade or blade part may then move rearward, e.g. being drawn by the rotor—the skilled person will appreciate that rear escape of blade debris may be acceptable, and may be much less likely to cause damage to the aircraft than forward escape.

The skilled person will appreciate that a position for the second hook may be selected dependent on several attributes of the (trailing) blade, such as blade span, chord and blade shape and the maximum, minimum and/or typical speed(s) of the fan. The second hook may be located at or near a forward edge of the fan case. The second hook may be located, for example, ten to fifty centimetres forward of the first hook, dependent on engine size. The skilled person will appreciate that, in embodiments in which the only (first) hook is a fore hook, the same considerations as described here for the second hook would apply to the first hook.

The metallic insert may be arranged to be mounted on an inner surface of the composite fan case.

The fan blade containment system may further comprise one or more trap doors.

The fan blade containment system may further comprise a first trap door. The first trap door may be at least partially mounted on the metallic insert. The first trap door may extend rearwardly from a region of the first hook. The first trap door has a forward edge and a rearward edge. The forward edge may be arranged to move outward/upward (towards the fan case) when or if struck so as to provide access to a hook, allowing the blade or blade part that struck the trap door to engage the hook.

The first trap door may be arranged to be detachably connected, optionally to the metallic insert, in the region of its forward edge. The first trap door may be arranged to be detachably connected to the first metallic hook at the forward edge region of the first trap door. A space (or a compressible region of e.g. the first trap door) may be provided between a forward region of the first trap door and the fan case to facilitate movement toward the fan case if struck (if load on the front panel induced by being struck meets or exceeds a set threshold/if struck hard enough—the skilled person will appreciate that the trap doors of various embodiments are arranged to respond to blade debris impacts and may be unaffected if struck with lower forces).

The first trap door may be arranged to bend or break if or when struck by a fan blade or fan blade part such that the forward region of the first trap door can move towards the fan case (e.g. with no movement, or only minimal movement, of the rearward region).

Alternatively or additionally, the first trap door may be arranged to be detachably connected, optionally to the metallic insert, in the region of its rearward edge. The detachable connection at the rearward edge region of the first trap door in such embodiments may allow the first trap door to move outwards relative to an engine core (upwards in the orientation shown in the Figures/towards the fan case), so allowing a failed blade to be captured by the metallic hook whether or not the trap door panel itself breaks or bends.

Alternatively or additionally, the first trap door may be arranged to be pivotally connected, optionally to the metallic insert, in the region of its rearward edge. The pivotal connection at the rearward edge region of the first trap door in such embodiments may allow the first trap door to swing outwards relative to an engine axis (upwards in the orientation shown in the Figures/towards the fan case), so allowing a failed blade to be captured by the metallic hook.

Alternatively or additionally, the first trap door may be arranged to be rigidly connected, optionally to the metallic insert, in the region of its rearward edge, for example in a cantilever-type arrangement.

The first trap door may be arranged to be detachably connected at its forward edge region, optionally to the metallic insert, for example by a frangible connector. The frangible connector may be arranged to break in response to pressure applied by a released blade or blade fragment. The detachable/frangible connection may be arranged to fail when struck by a failed blade or blade part. The strength of the detachable/frangible connection may be selected, e.g. based on a minimum expected impact force for a fan blade-off event. The skilled person will appreciate that the impact force is affected by rotor speed and size of the detached blade portion, amongst other factors. The same features may apply to the rearward connection in embodiments with a detachable rearward connection.

The first trap door may be located adjacent and rearward of the first metallic hook, such that a blade or blade part impacting the first trap door may be arrested by the first metallic hook. The fan blade containment system may comprise only one trap door, or no trap doors, even in embodiments with multiple hooks.

The fan blade containment system may further comprise a second trap door. The second trap door may be the only trap door in some embodiments. The second trap door may be at least partially mounted on the metallic insert. The second trap door may extend rearward from a region of the second hook. The second trap door has a forward edge and a rearward edge. The forward edge may be arranged to move outward/upward when struck so as to provide access to a hook, allowing the blade or blade part that struck the trap door to engage the hook. A space (or a compressible region) may be provided between the forward edge region of the second trap door panel and the fan case to facilitate the movement.

The second trap door may be arranged to be detachably connected, optionally to the metallic insert, in the region of its forward edge.

The second trap door may be arranged to bend or break when struck by a fan blade or fan blade part such that the forward region of the second trap door can move towards the fan case.

The second trap door may be arranged to be pivotally and/or detachably connected, optionally to the metallic insert, in the region of its rearward edge, as for the first trap door.

The second trap door may be located adjacent and rearward of the second metallic hook, such that a blade or blade part impacting the second trap door may be arrested by the second metallic hook.

The second trap door may be arranged to be detachably connected to the second metallic hook at the forward edge of the second trap door.

As for the first trap door, the second trap door may be arranged to be detachably connected, optionally to the metallic insert, by a frangible connector. The frangible connector may be arranged to break in response to pressure applied by a released blade or blade fragment. The detachable/frangible connection may be arranged to fail when struck by a failed blade or blade part. The strength of the detachable/frangible connection may be selected based on a minimum expected impact force for a fan blade-off event. The skilled person will appreciate that the impact force is affected by rotor speed and size of the detached blade portion, amongst other factors.

The skilled person will appreciate that expected impact forces may differ for different trap door locations in the same engine, and that the strength of the frangible connector may therefore differ between the first and second trap doors.

The skilled person will appreciate that various improvements in blade design have reduced blade effectiveness at penetrating fan case liners, so reducing the chance of a released blade or blade part being arrested by a liner instead of bouncing off, especially if that blade or blade part is released at part-speed, making known examples relying on penetration of the liner less likely to arrest forward motion of blade debris. The use of trap doors may therefore allow the released blade or blade part to pass through the liner and/or move the liner and be contained by the hook even with minimal or no damage to the liner.

The skilled person will appreciate that the presence of one or more hooks may prevent forward debris release by arresting forward motion of failed blades or blade parts. The skilled person will appreciate that the presence of one or more trap doors may improve performance of the system in part-blade and/or part-speed release, because the energy is lower, and thus the slow blade or "part blade" is more likely to skip over the casing and be released forward, rather than penetrating the liner, if there is no trap door.

The metallic insert may be mounted on the composite fan case by means of one or more through-case fasteners, such as bolts. The one or more through-case fasteners may be located adjacent and forward of the metallic hook, for example being adjacent and forward of the aft hook. The one or more through-case fasteners may be located towards the front and/or rear of the metallic insert. The one or more through-case fasteners may be located towards the rear of the metallic insert, for example located adjacent the aft/rearmost hook. The one or more through-case fasteners may be used alone or in addition to an adhesive and/or other fastening means.

The metallic insert may comprise an outer/base portion arranged to lie adjacent an inner surface of the fan case. The base portion may support the hooks. The base portion may facilitate connection of the insert to the fan case. The base portion may protect the composite fan case from impacts from blade debris or other debris within the fan case.

In embodiments with two hooks, the base portion may extend between the hooks.

The base portion may comprise a portion extending rearwardly from the (rear) metallic hook, which may be described as an extension or as a protection portion. The skilled person will appreciate that the region of the fan case behind a hook positioned to capture failed blades is adjacent blade tips in normal use, and that the fan case may be damaged by tip rub (e.g. following uneven expansion in use). The protection portion may therefore serve to protect the fan case from tip rub and/or from foreign body or blade/blade part impacts in that region. The extension may also provide additional support for the hooks; in particular for the aft hook.

According to a second aspect, there is provided a gas turbine engine for an aircraft comprising:
 a fan comprising a plurality of fan blades; and
 a fan blade containment system as described with respect to the first aspect surrounding the fan.

According to a third aspect, there is provided a metallic insert arranged to be mounted on a composite fan case surrounding a fan comprising a plurality of fan blades in a gas turbine engine for an aircraft. The metallic insert is arranged to prevent forward debris release should all or part of a fan blade become detached from the fan.

The metallic insert may comprise a first metallic hook arranged to prevent forward debris release should all or part of a fan blade become detached from the fan. The first metallic hook may be arranged to capture failed blades (including blade parts).

The metallic hook may comprise a fence extending around an inner circumference of the fan case, the fence extending inwardly from the fan case.

The metallic hook may comprise a lip extending rearwardly from the fence. The lip may be spaced inwardly from the inner circumference of the fan case; for example extending from an inner edge region of the fence.

The skilled person will appreciate that "rearward" is defined with respect to a front and back of the engine in use (i.e. "rearward" indicates a direction opposed to the flight direction).

The lip may be oriented (at least substantially) parallel to the axis of the fan case/the engine.

The fence may be oriented (at least substantially) radially.

The lip may extend from an inner region of the fence, and optionally from an inner edge of the fence.

The hook may be curved or angled where the lip and fence meet.

The metallic insert may further comprise a second metallic hook arranged to prevent forward debris release should all or part of a fan blade become detached from the fan, the second metallic hook being located forward of the first metallic hook. The second metallic hook (also referred to as a fore hook) may be arranged to capture trailing blades and/or metalwork (e.g. leading edge metalwork) separated from a composite blade (e.g. due to bird-strike).

The metallic insert may further comprise (e.g. have mounted thereon) a first trap door having a forward edge and a rearward edge. The first trap door may not be metallic. The first trap door may be detachably connected, optionally to the metallic insert, in the region of its forward edge. The first trap door may be arranged to be detachably connected to the (first) metallic hook at the forward edge region of the first trap door.

The first trap door may be arranged to bend or break so as to allow a forward region of the first trap door to move toward the fan case when struck.

The first trap door may be arranged to be pivotally and/or detachably connected, optionally to the metallic insert, in the region of its rearward edge, so as to allow a forward region of the first trap door to move toward the fan case when struck.

The metallic insert may further comprise a second trap door located forward of the first metallic hook and having a forward edge and a rearward edge. The second trap door may be arranged to bend or break so as to allow a forward region of the second trap door to move toward the fan case when struck.

The second trap door may be arranged to be pivotally and/or detachably connected to the metallic insert in the region of its rearward edge and detachably connected to the metallic insert in the region of its forward edge. The second trap door may be arranged to be detachably connected to the second metallic hook at or near the forward edge of the second trap door.

The first and second trap doors may not be metallic.

According to a fourth aspect, there is provided a gas turbine engine for an aircraft comprising:
 a fan comprising a plurality of fan blades;
 a composite fan case surrounding the fan; and
 a metallic insert as described with respect to the third aspect, mounted on the composite fan case.

According to a fifth aspect there is provided a fan blade containment system arranged to surround a fan comprising a plurality of fan blades in a gas turbine engine for an aircraft. The fan blade containment system comprises a composite fan case arranged to surround the fan; and a metallic insert mounted on the composite fan case.

The metallic insert comprises a metallic hook. The metallic hook comprises:
 a fence extending around an inner circumference of the fan case, the fence extending inwardly from the fan case; and
 a lip extending rearwardly from the fence.

The skilled person will appreciate that "rearward" is defined with respect to a front and back of the engine in use (i.e. "rearward" indicates a direction opposed to the flight direction).

The lip may be oriented (at least substantially) parallel to the axis of the fan case/the engine.

The fence may be oriented (at least substantially) radially.

The lip may extend from an inner region of the fence.

In a fan blade-off event, a blade tip or other edge of a failed blade or blade part may be forced under the lip; the hook may therefore arrest forward motion of the blade or blade part. The lip is spaced from the fan case/from a base portion of the metallic insert overlying the fan case so as to provide a gap between the lip and the fan case/base portion of the metallic insert of sufficient width to accommodate and engage a blade tip.

The metallic hook may be arranged to prevent forward debris release should all or part of a fan blade become detached from the fan. The skilled person will appreciate that forward axial motion of debris, resulting in forward release, is more likely to damage the aircraft than rear axial release.

The skilled person will appreciate that metal can be machined or otherwise shaped to provide specific features, potentially more easily than a composite can be formed into the relevant shapes, and/or with greater strength of the resultant part.

The fan blade containment system may have any or all of the features of the first aspect.

According to a sixth aspect, there is provided a metallic insert arranged to be mounted on a composite fan case surrounding a fan comprising a plurality of fan blades in a gas turbine engine for an aircraft. The metallic insert is arranged to form part of a fan blade containment system. The metallic insert comprises a metallic hook. The metallic hook comprises:
 a fence extending around an internal circumference of the fan case, the fence extending inwardly from the fan case; and
 a lip extending rearwardly from the fence.

The lip may be oriented (at least substantially) parallel to the axis of the fan case/the engine.

The fence may be oriented (at least substantially) radially.

The lip may extend from an inner region of the fence.

The metallic insert may have any or all of the features of the third aspect.

According to a seventh aspect, there is provided a gas turbine engine comprising:
 a fan blade containment system of the fifth aspect; or
 a composite fan case, and a metallic insert of the sixth aspect mounted on the composite fan case.

According to an eighth aspect, there is provided a fan blade containment system arranged to surround a fan comprising a plurality of fan blades in a gas turbine engine for an aircraft. The fan blade containment system comprises:
 a fan case arranged to surround the fan;
 a debris retainer mounted on the fan case and arranged to prevent forward debris release should all or part of a fan blade become detached from the fan; and
 a front panel mounted on the fan case and located forward of the fan and rearward of the debris retainer, and arranged to move and/or break on being struck by a detached fan blade or fan blade part so as to facilitate the detached fan blade or fan blade part engaging the debris retainer.

The front panel may be arranged to move and/or break only if struck with a force above (or equal to) a set threshold. The threshold may be set based on expected impact forces from detached blades or blade parts.

The entire front panel may be forward (i.e. axially forward) of the fan. The leading and trailing edges of the front panel may both be forward of the leading edges of the tips of the fan blades.

The movement and/or breaking of the front panel may allow access to the debris retainer for debris—the front panel may partially or completely block such access until it is moved and/or broken.

The front panel may be arranged to move if or when struck, and may be described as a trap door, or as being arranged to act as a trap door.

The fan blade containment system may comprise a gap or compressible region between a forward region of the front panel and the fan case. The gap may be arranged to facilitate movement of a forward region of the front panel toward the fan case when struck.

The front panel being arranged to move or break may be described as the front panel having one or more set failure mechanisms; the skilled person will appreciate that controlled failure of the front panel may be used to absorb energy from a released blade or blade-part, and/or to direct that blade or blade-part in such a way as to prevent forward release.

The debris retainer may be or comprise a hook or a fence as described with respect to the earlier aspects. The fence may be as described for the hook, but without a lip.

The front panel may have a forward edge and a rearward edge and may be detachably connected to the fan case at or near its forward edge such that a forward region of the front panel can move toward the fan case if struck.

The front panel may be arranged to be detachably connected to the fan case by a frangible connector, the frangible connector being arranged to break in response to pressure applied by a released blade or blade fragment.

The frangible connector may be or comprise a frangible bolt and/or a frangible attachment flange arranged to receive an (optionally frangible) bolt or other connector.

The front panel may be arranged to be detachably connected to the debris retainer at or near the forward edge of the front panel. In embodiments with a frangible bolt, the frangible bolt may extend through the debris retainer (e.g. through the lip of a hook) and through an attachment flange of the front panel.

The front panel may take the form of a cantilever. The front panel may be cantilevered by connection (optionally by a rigid connection) to the fan case at or near its rearward edge such that a forward region of the front panel can move toward the fan case if struck. The connection may be directly to the fan case, or to an insert mounted on the fan case. The front panel may not be connected to the fan case or debris retainer, or at all, in its forward region.

The fan blade containment system may comprise a gap between a forward edge of the front panel and the debris retainer. The gap may be arranged to expose the debris retainer to debris traveling forward on or near the surface of the front panel. In such embodiments, movement or breaking of the front panel may not be necessary for some debris to reach the hook, depending on debris position and trajectory.

The front panel may be a front acoustic panel (FAP). The front panel may be described as an acoustic panel due to its properties being selected for noise attenuation. The front panel may be a FAP trap door.

The front panel may comprise a core sandwiched between a backing sheet and a face sheet. The sheets may be composite sheets; i.e. may be made from or comprise a composite material. The core may have a honeycomb structure and may therefore be described as a honeycomb core.

Either or both of the sheets may be perforated. The perforations may provide noise attenuation, reducing the volume of the engine.

The backing sheet may be arranged to fail, optionally in tension, in response to load on the front panel meeting or exceeding a first set threshold.

The backing sheet may comprise one or more holes sized and/or spaced to trigger failure of the front panel in response to load on the front panel meeting or exceeding the set threshold. For example, the holes may have a diameter of between 2 mm and 10 mm, and may be spaced apart by a distance of one to ten times the diameter. The skilled person would appreciate that, with bigger holes, more material is removed and the panel is weakened more. Similarly, the smaller the spacing, the closer the holes and the weaker the panel. In the embodiments being described, the holes are angled to be normal through the thickness of the sheets. In other embodiments, the holes may be differently angled.

A thickness of the backing sheet may be selected to trigger failure of the front panel in response to load on the front panel meeting or exceeding a set threshold—in embodiments with both holes and a selected thickness, the set thresholds may be the same or different. The backing sheet may be tapered along an unsupported span of the front panel.

The face sheet may be arranged to fail, optionally in compression, in response to load on the front panel meeting or exceeding a second set threshold. In embodiments with both a weakened backing sheet and a weakened face sheet, the second set threshold may be equal to, or different from, the first set threshold.

The face sheet may comprise one or more holes sized and/or spaced to trigger failure of the front panel in response to load on the front panel meeting or exceeding the second set threshold. For example, the holes may have a diameter of between 2 mm and 10 mm, and may be spaced apart by a distance of one to ten times the diameter.

The face sheet may have a fold or wrinkle in the face sheet. The fold or wrinkle may be sized to trigger failure of the front panel in response to load on the front panel meeting or exceeding a set threshold.

A thickness of the face sheet may be selected to trigger failure of the front panel in response to load on the front panel meeting or exceeding the second set threshold. The face sheet may be tapered along an unsupported span of the front panel.

In embodiments with two or more of holes, a fold/wrinkle and a selected thickness for the face sheet, the set thresholds may be the same or different for each failure mechanism.

The front panel may be arranged to trigger shear failure of the core when load on the front panel meets or exceeds a third set threshold. The third set threshold may be equal to, or different from, either or both of the first and second set thresholds.

The core may comprise a gap therethrough. The gap may be sized and/or spaced to cause the core to shear when load on the front panel meets or exceeds the third set threshold.

The front panel may be arranged to be penetrated by debris on being struck provided that a load exerted by the debris meets or exceeds a fourth set threshold. The fourth set threshold may be equal to, or different from, any or all of the first, second and third set thresholds.

The skilled person will appreciate that the thresholds may be set based on an understanding of the likely impact forces in fan blade-off events and part-blade release and fan (part-) blade shape, size and strength. The thresholds may be set such that more minor impacts, such as some bird strike impacts, do not affect the front panel. Further, different thresholds may be set for different failure mechanisms such that different types of impact trigger different responses—for example, a single response may be triggered by a part-speed part-blade release and two responses may be triggered by a higher-speed and/or full blade release.

The face sheet of the front panel may comprise one or more joints and/or one or more holes sized and/or spaced to facilitate shear of the face sheet when struck. Again, the hole(s) and/or joint(s) may be arranged to facilitate shear only when the impact is above a set threshold. For example, the holes may have a diameter of between 2 mm and 10 mm, and may be spaced apart by a distance of one to ten times the diameter.

The fan case may be a composite fan case. A metallic insert may be mounted on the composite fan case, the metallic insert optionally comprising the debris retainer, and optionally having the front panel at least partially mounted thereon. The metallic insert may be as described in any preceding aspect.

According to a tenth aspect, there is provided a fan blade containment system arranged to surround a fan comprising a plurality of fan blades in a gas turbine engine for an aircraft. The fan blade containment system comprises:
a fan case arranged to surround the fan;
a fence extending around an inner circumference of the fan case, the fence extending inwardly from the fan case; and
a front panel mounted on the fan case and located forward of the fan and rearward of the fence, and arranged to move or break if struck by a detached fan blade or fan blade part so as to facilitate the detached fan blade or fan blade part engaging the fence.

The front panel may be located such that its rearward edge is forward of, and optionally spaced from, a leading edge blade tip position of the fan.

The front panel may be arranged to move and/or break only when struck with a force above (or equal to) a set threshold.

The front panel may be a front acoustic panel.

The fence may be described as a debris retainer. The fence may further comprise a lip extending rearwardly from the fence, so forming a hook. The hook may be described as a debris retainer.

According to a tenth aspect, there is provided a gas turbine engine for an aircraft, the gas turbine engine comprising:
a fan comprising a plurality of fan blades; and
a fan blade containment system according to the eighth or ninth aspect, surrounding the fan.

According to an eleventh aspect, there is provided a fan blade containment system arranged to surround a fan comprising a plurality of fan blades in a gas turbine engine for an aircraft, the fan blade containment system comprising a fan case arranged to surround the fan, and two hooks extending inwardly from the fan case.

The first debris retainer extends inwardly from the fan case and is arranged to prevent forward debris release should all or part of a fan blade become detached from the fan, the first debris retainer being located forward of the fan, and optionally near or adjacent the fan.

The second debris retainer extends inwardly from the fan case and is arranged to prevent forward debris release should all or part of a fan blade become detached from the fan, the second debris retainer being located forward of the first debris retainer.

Either or both of the debris retainers may be or comprise a fence extending inwardly from the fan case inner circumference. The fence may have a width (in the axial direction) of around 3 mm to 10 mm.

Either or both of the debris retainers may be or comprise a hook extending inwardly from the fan case inner circumference and having a rearwardly-directed lip. The hook may have a width (in the axial direction) of around 3 mm to 10 mm.

The first debris retainer may be arranged to arrest forward motion of a released blade or blade-part. The first debris retainer may be located adjacent a leading edge blade tip of the fan.

The second debris retainer may be arranged to arrest forward motion of a trailing blade or blade-part (i.e. a blade or blade-part caused to detach from the fan by the impact of a previously-detached blade or blade-part). The second debris retainer may be located adjacent a forward edge of the fan case.

The first and second debris retainers may be metallic. In such embodiments, the first and second debris retainers may be provided as part of a metallic insert mounted on the fan case, which may be a composite fan case. Alternatively, the fan case may be metallic and the metallic first and second debris retainers may be integral with the fan case, for example being machined therefrom or welded thereto.

The first debris retainer may have a trap door associated therewith. The first trap door may extend from rearward of the fan to adjacent the first debris retainer. The first trap door may serve as a fan track liner. The first trap door may be arranged to move and/or break when struck by a detached fan blade or blade part so as to facilitate the detached fan blade or fan blade part engaging the first debris retainer. The first trap door may be arranged not to move and/or break when struck with a force less than a set threshold; for example the first trap door may be arranged to be abradable to accommodate tip rub.

The second debris retainer may have a trap door associated therewith. The second trap door may extend from forward of the first debris retainer to adjacent the second debris retainer. The second trap door may extend between the two debris retainers. The second trap door may be arranged to move and/or break when struck by a detached fan blade or blade part so as to facilitate the detached fan blade or fan blade part engaging the second debris retainer. The second trap door may be arranged not to move and/or break when struck with a force less than a set threshold. The set threshold for the second trap door may be the same as, or different from, that for the first trap door. The second trap door may be a front acoustic panel (FAP). The second trap door may be as described in the ninth aspect.

The first debris retainer may be located near or adjacent the fan, and more specifically may be located near or adjacent a leading edge of a blade tip of the fan.

The first debris retainer may be located between 1 cm and 15 cm forward of a leading edge blade tip of the fan.

The second debris retainer may be located between 10 cm and 50 cm forward of the first debris retainer The second debris retainer may be located at or near a forward edge of the fan case.

The first and second debris retainers are therefore axially spaced from each other.

According to a twelfth aspect, there is provided a fan blade containment system arranged to surround a fan comprising a plurality of fan blades in a gas turbine engine for an aircraft, the fan blade containment system comprising:
a fan case arranged to surround the fan;
a first debris retainer located forward of the fan, the first debris retainer comprising a fence extending around an internal circumference of the fan case, the fence extending inwardly from the fan case; and
a second debris retainer located forward of the first debris retainer, the second debris retainer comprising a fence extending around an internal circumference of the fan case, the fence extending inwardly from the fan case.

The fence of either or both debris retainers may extend inwardly from the fan case by between 40 mm and 60 mm.

The fences of the two debris retainers may be at least substantially parallel to each other.

The fence of either or both debris retainers may extend radially inward from the fan case.

At least one of the debris retainers may be a hook, and may comprise a lip extending rearwardly from the fence.

The lip of either or both hooks may extend rearwardly from the corresponding fence by between 3 mm and 15 mm.

The lip of either or both hooks may extend axially rearwardly.

The lip of either or both hooks may extend parallel to the fan case.

The lip of either or both hooks may extend perpendicularly to the corresponding fence.

The lip of either or both hooks may extend rearwardly from an inward end region of the corresponding fence.

The containment system of the twelfth aspect may include any or all features of the eleventh aspect, and vice versa.

According to a thirteenth aspect, there is provided a gas turbine engine for an aircraft comprising:
  a fan comprising a plurality of fan blades; and
  a fan blade containment system according to the eleventh and/or twelfth aspect.

The skilled person will appreciate that features described with respect to one aspect may be applied to any other aspect, mutatis mutandis.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise conditions. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which:

FIG. 17 illustrates a FAP trap door arranged to be locally penetrated on impact;

FIG. 18A illustrates a FAP trap door with a retainer arranged to fail on impact;

FIG. 18B illustrates holes in an attachment flange of the retainer of FIG. 18A;

FIG. 18C illustrates ply-drop in an attachment flange of the retainer of FIG. 18A;

In the Figures, like reference numerals are used for like components.

Figure 1:
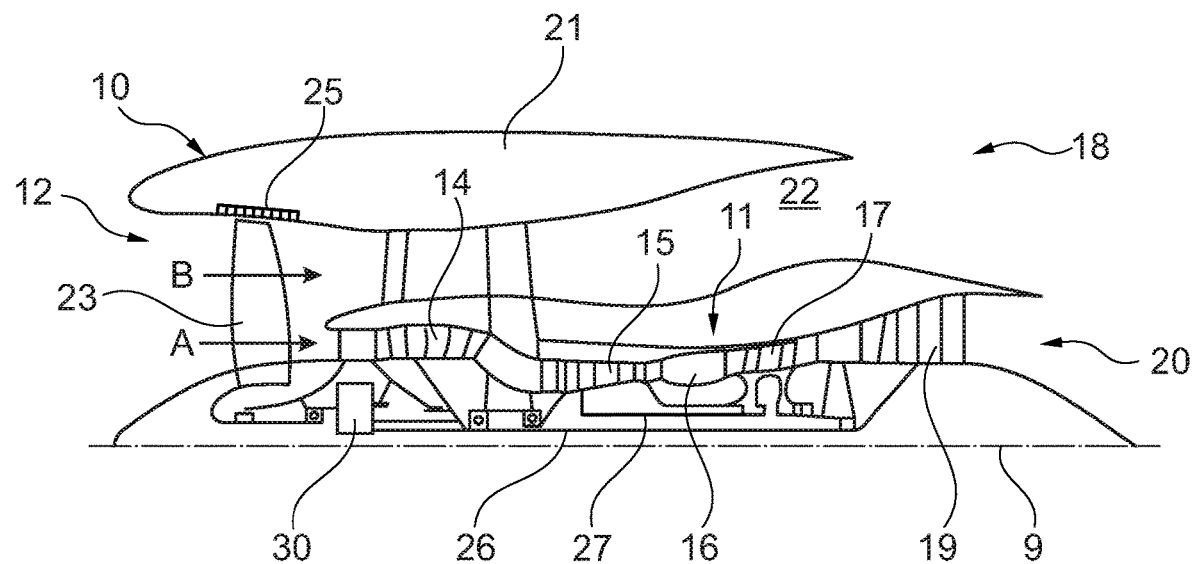
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle, also referred to as a fan case, 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
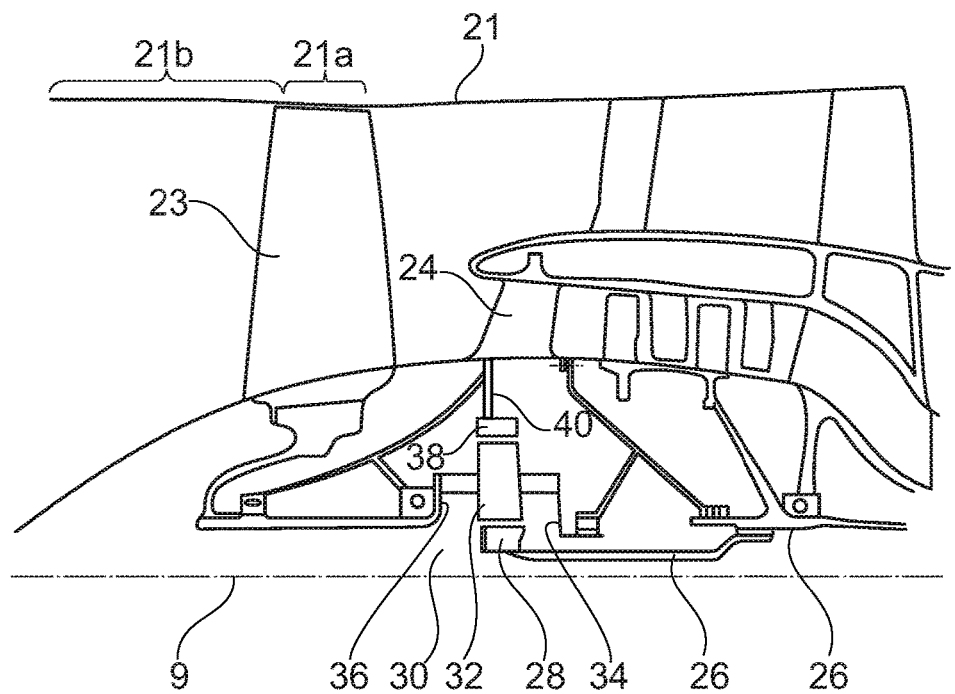
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
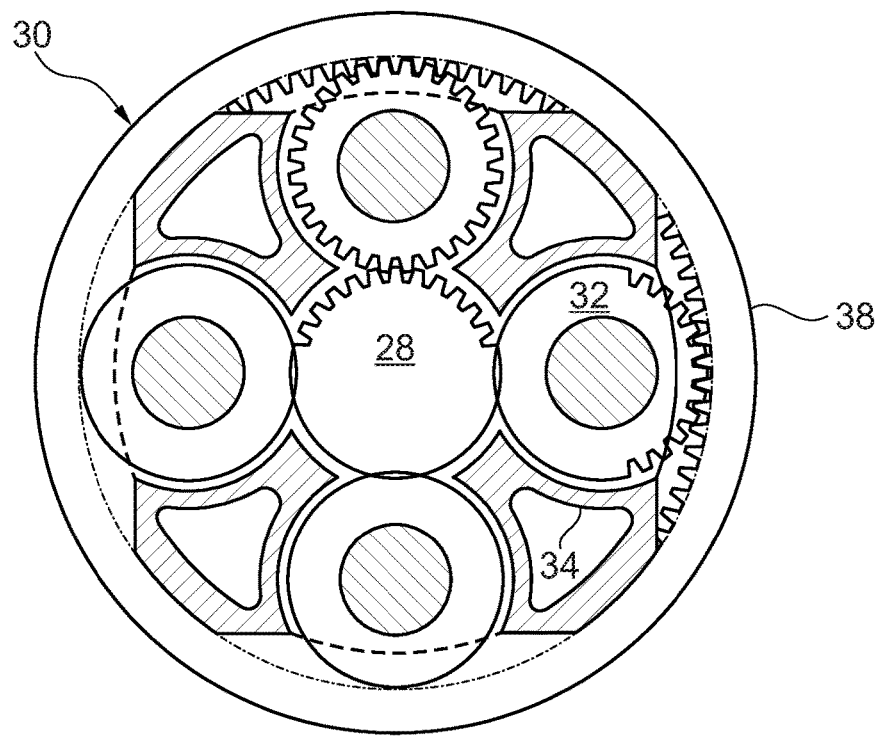
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine with a fan case. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
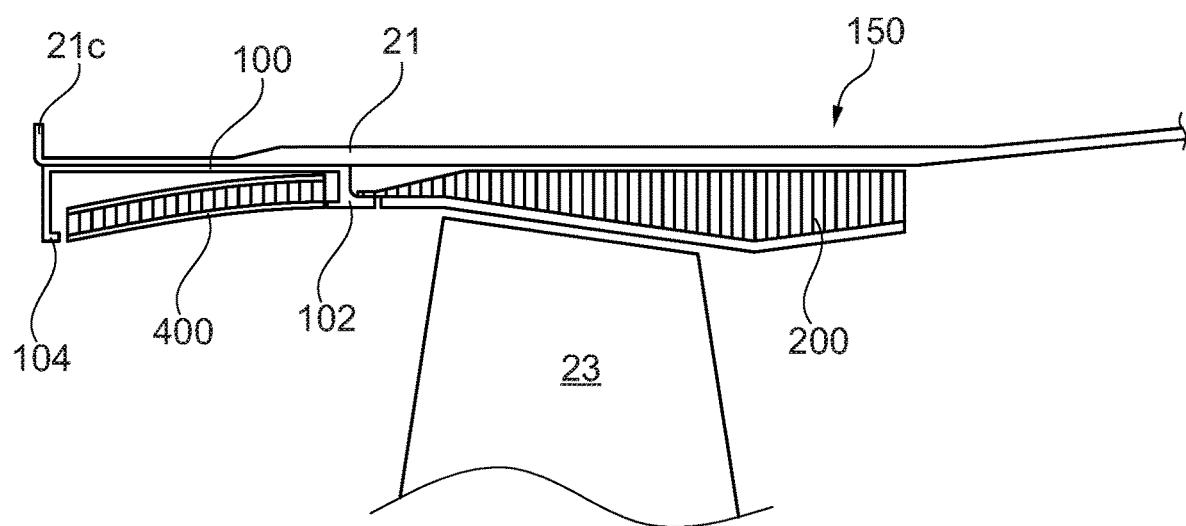
FIG. 4 is a sectional side view of a part of a fan blade containment system in place around a fan, the fan blade containment system comprising two hooks and two trap doors.

FIG. 4 illustrates a fan blade containment system 150 in position around the fan 23.

The fan blade containment system 150 of FIG. 4 comprises a composite fan case 21 and a metallic insert 100 mounted on the fan case 21.

In the embodiment being described, the metallic insert 100 is fully within the fan case 21. In the embodiment being described, the metallic insert 100 is mounted to an internal surface of the fan case 21. In alternative embodiments, the metallic insert 100 may extend beyond the fan case 21, and/or may be mounted, at least in part, to an external surface of the fan case 21.

In the embodiment being described, the metallic insert 100 is rotationally symmetric and may be inserted into the fan case 21 at any angle measured in the circumferential direction, provided that the insert 100 and fan case 21 are axially aligned. In alternative embodiments, the shape of the insert 100 may vary around the circumference, for example to accommodate connectors or other engine parts. In such embodiments, the insert 100 may be inserted into the fan case 21 in a set orientation, or in one of several possible set orientations.

In the embodiment being described, the fan case 21 is made of a carbon fibre composite with an organic matrix (such as epoxy or bismaleimide (BMI) resin). In the embodiment being described, the carbon fibres are woven. In other embodiments, any suitable composite known in the art may be used.

In the embodiment being described, the metallic insert 100 is made of steel. In other embodiments, any suitable metal(s) and/or alloy(s) known in the art may be used.

The fan case 21 surrounds the rest of the gas turbine engine 10. In the embodiment shown in FIG. 4, the metallic insert 100 is mounted on an inner surface of the fan case 21.

In the embodiment shown in FIG. 4, the metallic insert 100 is located in a front region of the fan case 21, extending from a forward edge region of the fan case 21 towards the blades 23 of the fan.

Figure 6:
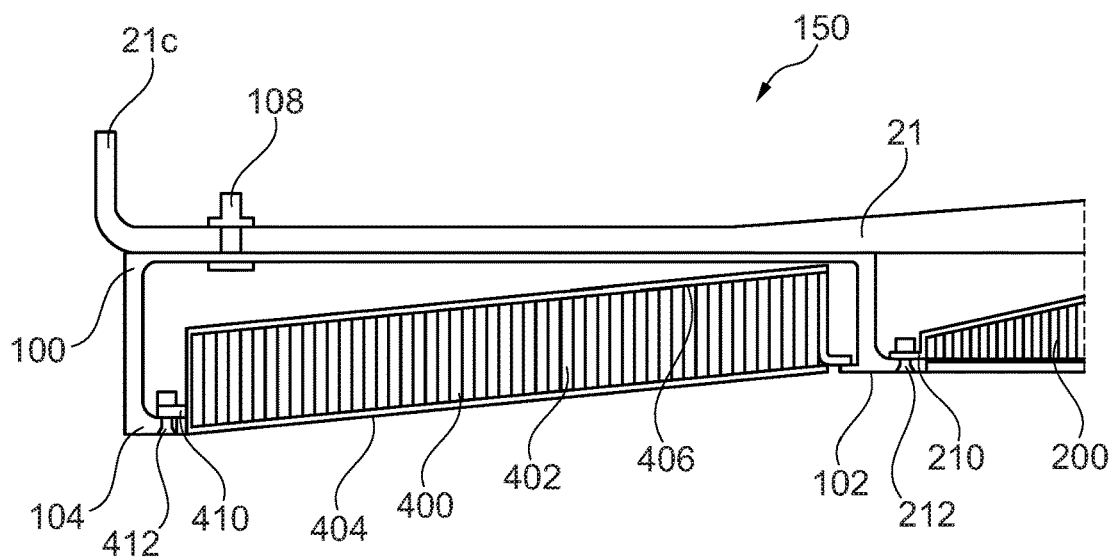
FIG. 6 is a sectional side view of a part of a variation of the fan blade containment system shown in FIG. 4.

In the embodiment being described, the metallic insert 100 is mounted to the inner surface of the fan case 21 by means of an adhesive layer and multiple bolts (not shown in FIG. 4, bolt shown in FIG. 6). The bolts 108 pass through the fan case 21 and through the insert 100 in the embodiment being described, and may be described as through-case fasteners 108. In the embodiment being described, the insert 100 comprises holes arranged to receive the bolts 108. In the embodiment being described, the bolts 108 are spaced around the circumference of the fan case 21/of the insert 100.

In the embodiment being described, a film adhesive and/or a paste adhesive is used to mount the metallic insert 100 to the inner surface of the fan case 21. The skilled person will appreciate that a paste adhesive may be selected when additional thickness and/or toughness is required, and that use of a paste adhesive may also help to prevent thermal pre-stress from curing.

In embodiments in which a film adhesive is used, a typical thickness of the adhesive layer may be around 0.5 mm, for example being between 0.25 mm and 0.75 mm.

In embodiments in which a paste adhesive is used, a typical thickness of up to 3 mm or up to 2 mm may be used, for example being between 0.5 mm and 2.0 mm.

In the embodiment being described, the bolts 108 are evenly spaced around the circumference of the fan case 21. In the embodiment shown in FIG. 6, the bolts 108 are located towards the front of the insert 100. In alternative or additional embodiments, bolts 108 may be located toward the rear of the insert 100—the skilled person will appreciate that location near edges of the insert 100, and particularly rearward location, of the bolts 108 may provide improved resistance to peel stresses (e.g. caused by blade impacts) on the insert 100 in some embodiments. In the embodiment being described, the bolts 108 are arranged to allow a small amount of relative movement/expansion between the insert 100 and the fan case 21. The skilled person will appreciate that the composite fan case 21 and metallic insert 100 are likely to have different coefficients of thermal expansion, and therefore to expand or contract to different extents at different stages of use.

In the embodiment being described, the adhesive layer is provided between a base portion 100a of the insert 100 adjacent the fan case 21 and the fan case 21. In the embodiment being described, the base portion 100a of the insert 100 is at least substantially cylindrical.

In the embodiment being described, the insert 100 comprises a first metallic hook 102 located in a rearward edge region, and more particularly at a rearward edge, of the insert 100. In alternative embodiments, as discussed below, the base portion 100a may extend rearward of the metallic hook 102. The first metallic hook 102 comprises an inwardly-directed wall or fence 102a with a rearwardly-directed inner lip 102b. The metallic hook 102 is therefore a circular/cylindrical hook extending inwardly from the inner circumference of the fan case 21.

In the embodiment being described, the fence 102a extends radially inward from an inner circumference of the fan case 21.

In the embodiment being described, the lip 102b extends axially rearward from an inner edge region of the fence 102a. In alternative embodiments, the fence 102a may extend further inward beyond the lip 102*b* (for example to provide or protect an attachment region for a trap door or panel as discussed below).

The skilled person will appreciate that the angles between the base portion 100*a*/the fan case 21 and the wall/fence 102*a*, and/or between the wall/fence 102*a* and the lip 102*b* may not be 90° in some embodiments—the fence 102*a* may therefore not be radial and the lip 102*b* may not be axial.

The first metallic hook 102 is located near, but forward of, the fan blades 23. The first metallic hook 102 is arranged to arrest forward motion of a released blade or blade part.

In the embodiment being described, the insert 100 comprises a second metallic hook 104 located in a forward edge region, and more particularly at a forward edge, of the insert 100. In alternative embodiments, the base portion 100*a* may extend forward of the second metallic hook 104. The second metallic hook 104 comprises an inwardly-directed wall with a rearwardly-directed inner lip 104*b*. The second metallic hook 104 is therefore a circular hook extending inwardly from the inner circumference of the fan case 21. The skilled person will appreciate that the angles between the base portion 100*a* and the wall 104*a* and between the wall 104*a* and the lip 104*b* may not be 90° in some embodiments.

The second metallic hook 104 is further forward of the fan blades 23 than the first metallic hook 102, and may be referred to as a fore hook 104. The first metallic hook 102 may therefore be referred to as an aft hook. In the embodiments being described, the second metallic hook 102 is arranged to arrest forward motion of a trailing blade or blade part, or of peeled metalwork from a composite blade, in the embodiment being described. The skilled person will appreciate that the expected locations of impacts for different kinds of blade off events may vary for different engine designs and that the roles of the first and second hooks 102, 104 may therefore differ in other embodiments.

In the embodiment being described, the second metallic hook 104 is level with a forward edge of the fan case 21. In alternative embodiments, the second metallic hook 104 may be behind or in front of the forward edge of the fan case 21.

In the embodiment being described, each hook 102, 104 has a thickness of around 3 mm to 10 mm. The skilled person will appreciate that hook strength should be sufficient to arrest forward motion of blades/blade parts, and that the minimum thickness selected may vary between embodiments depending on material of the insert, rotor speed, blade design and the likes. Hook thickness may therefore be selected as a function of the blade threat, considering likely blade energy and the strength/thickness of the blade.

In the embodiment being described, the base portion 100*a* of the insert 100 is narrower than the hooks 102, 104, with a thickness of around 0.5 mm to 1.5 mm. The skilled person will appreciate that the base portion thickness may be sized to resist the moment applied on the hook 102, 104 through interaction with the blade 23, and may therefore also be a function of blade energy and/or the strength/thickness of the blade. In some embodiments, the thickness may be beyond that required for hook support to supplement the containment capability of the fan case 21, and optionally protect the composite material.

In the embodiment being described, the fan track liner 200 (described below) has a depth of around 40-50 mm, and the aft hook 102 extends such that its inner end is at least substantially level with an inner surface of the fan track liner 200, so extending around 40-50 mm inwards from the base portion of the insert 100—i.e. the gap between the base portion 100*a* and the lip 102*b* of the hook 102 is around 40-50 mm. In the embodiment being described, the fan track liner 200 is arranged to bend upward when struck, such that its forward edge rises around 10 mm above (in the orientation shown) the lip 102*b* of the hook 102. In this embodiment, a blade tip has a width of between 4 mm and 8 mm, and more specifically around 6 mm, so the 10 mm gap is sufficient to receive the blade tip. In other embodiments, the blades 23 may be wider or narrower and hook spacing may be adjusted accordingly.

In the embodiment being described, the front panel 400 (described below) has a depth of around 40-50 mm, similar to that of the fan track liner 200, but is angled downwards/inwards from back to front. The fore hook 104 therefore extends such that its inner end is at least substantially level with an inner surface of the front panel 400, so extending further than the aft hook 102. In the embodiment being described, the fore hook 104 extends around 45-55 mm inwards from the base portion of the insert 100—i.e. the gap between the base portion 100*a* and the lip 102*b*, 104*b* of the hook 102, 104 is around 45-55 mm. In the embodiment being described, the front panel 400 is arranged to bend upward when struck, such that its forward edge rises around 10 mm above (in the orientation shown) the lip 104*b* of the hook 104. In this embodiment, a blade tip has a width of between 4 mm and 8 mm, and more specifically around 6 mm, so the 10 mm gap is sufficient to receive the blade tip. In other embodiments, the blades 23 may be wider or narrower and hook spacing may be adjusted accordingly.

In the embodiment being described, each lip 102*b*, 104*b* extends rearwardly from the fence/wall 102*a*, 104*a* by between 3 mm and 10 mm, and more specifically by around 5 mm.

In the embodiment being described, in a fan blade-off event the blade tip of a released blade 23 is arranged to curl under the hook 102, 104 as the blade begins to move forward, so arresting the forward motion. The rotor may then draw the released blade 23 backwards—the skilled person will appreciate that rear escape of blade debris may be acceptable, and may be much less likely to cause damage to the aircraft than forward escape.

In the embodiment being described, each hook 102, 104 is provided with a corresponding trap door 200, 400. (Here the fan track liner 200 and panel 400 are panels that form trap doors, and thus the same reference numerals are used to describe the respective panels and trap doors.) In alternative embodiments, only one of the two hooks 102, 104 may be provided with a trap door, or no trap doors may be present. Each trap door 200, 400 comprises a panel 200, 400 of which at least a part is arranged to move outward/towards the fan case 21 if struck with a detached blade/blade debris.

In the embodiment being described, the first trap door 200 is located rearward of the first hook 102 and arranged such that a blade 23 or blade part impacting the trap door 200 pushes the trap door outwards towards the fan case 21 (upwards in the orientation shown in the figures), so facilitating capture of the blade or blade part by the first hook 102.

In the embodiment being described, the first trap door 200 extends rearwardly from the first hook 102.

In the embodiment being described, the first trap door 200 extends rearwardly from the rear end region of the insert 100.

In the embodiment being described, a rearward portion of the first trap door 200 is connected to the fan case 21. The first trap door 200 is arranged to bend or break when struck such that a front portion thereof can move towards the fan case 21, providing access to the hook 102. In the embodiment being described, the rear connection is arranged to break if a force above a set threshold is applied to the trap door panel 200, so allowing the whole panel 200 to move towards the fan case 21.

In the embodiment being described, the first trap door 200 narrows along its length from front to back such that there is a gap between its forward portion and the fan case 21, so facilitating outward movement/bending of the trap door panel 200. In alternative or additional embodiments, a hinged, or pivotal, connection may be provided to allow the upward movement without, or with reduced, bending of the panel 200 or damage to the rear connection.

In the embodiment being described, the panel 200 of the first trap door is arranged to lie between the blade tips and the fan case 21 in normal operation. The first trap door 200 lies along a first portion 21a of the fan case 21 adjacent the blade tips. The panel 200 of the first trap door may be referred to as a fan case liner. In the embodiment being described, a surface of the fan case liner 200 is selected to be abradable so as to accommodate tip rub—i.e. if the tip of a blade rubs against the fan case (or fan track) liner 200 in operation (e.g. due to differential expansion), the affected part of the liner 200 is rubbed away without damaging the blade tip.

In the embodiment being described, a forward portion of the first trap door 200 is connected to the metallic insert 100. In alternative embodiments, the forward portion of the first trap door 200 may be connected to a portion of the fan case 21 adjacent the metallic insert 100. In alternative embodiments, the forward portion of the first trap door 200 may not be connected to anything—the first trap door 200 may be rear-mounted in a cantilever-type arrangement.

In the embodiment being described, the forward portion of the first trap door 200 is connected to the first hook 102. In alternative embodiments, the forward portion of the first trap door 200 may be connected to a portion of the insert 100 adjacent and rearward of the first hook 102.

In the embodiment being described, the forward connection is designed to fail when the trap door 200 is struck by a blade or blade part so that the trap door panel 200 can move outward/towards the fan case 21 and allow the failed blade to engage the hook 102. The connection may therefore be described as a frangible connection. In the embodiment being described, the frangible connection is provided by a frangible bolt 212 passing through the first hook 102 and through a connection region 210 of the trap door 200. The strength of the frangible bolt 212 is selected according to the minimum impact force for which the trap door 200 is designed to open.

In the embodiment being described, the first trap door 200/fan track liner 200 is arranged to be bolted to the fan case 21 for ease of removal and replacement.

In the embodiment being described, the second trap door 400 is located rearward of the second hook 104 (forward of the first hook 102) and arranged such that a blade 23 or blade part impacting the second trap door 400 pushes the trap door outwards towards the fan case 21 (upwards in the orientation shown in the figures), so facilitating capture of the blade or blade part by the second hook 104.

In the embodiment being described, the second trap door 400 extends rearwardly from the front end region of the insert 100 to the back end region of the insert, between the first and second hooks 102, 104. The second trap door 400 lies along a second portion 21b of the fan case 21, forward of the blade tips.

In the embodiment being described, a rearward portion of the second trap door 400 is connected to the insert 100. The second trap door 400 is arranged to bend or break when struck such that a front portion thereof can move towards the fan case 21, providing access to the hook 104. In the embodiment being described, the rear connection is arranged to break if a force above a set threshold is applied to the trap door panel 400, so allowing the whole panel 400 to move towards the fan case 21. The panel 400 may be sized and shaped to be retained by the hooks 102, 104 even if the front and rear connections both break.

In the embodiment being described, the second trap door 400 curves, or is angled, downward/inward along its length from back to front such that there is a larger gap 450 between its forward portion and the fan case 21/base of the insert 100 than between its rear portion and the fan case 21/base of the insert 100, so allowing the upward movement of the trap door panel 400. In alternative or additional embodiments, the height of the second trap door 400 may reduce towards the front to provide or increase the gap 450, and/or the gap 450 may be replaced by a compressible region of the trap door 400, insert 100, or fan case 21.

In alternative or additional embodiments, a hinged, or pivotal, connection may be provided to allow the upward movement without, or with reduced, bending of the panel 400 or damage to the rear connection.

In the embodiment being described, the rearward portion of the second trap door 400 is connected to the first hook 102, and more specifically to a forward-directed lip of the first hook 102. The first hook 102 is substantially T-shaped in cross-section in the embodiment being described. In the embodiment being described, the forward-directed lip of the first hook 102 is thinner than the rearward-directed lip 102b. The skilled person will appreciate that less strength may be needed to retain the second trap door 400 than to retain a released blade 23, allowing for a weaker lip, and that a thinner lip may reduce weight.

In the embodiment being described, the panel 400 of the second trap door is arranged to extend along a front region of the fan case 21, in front of the blades and in front of the panel 200 of the first trap door. The panel 400 of the second trap door is a front acoustic panel (FAP) in the embodiment being described. FAP material and structure may be selected to absorb engine noise. The FAP 400 may be thought of as providing a forward part of a fan track liner 200, 400.

In the embodiments described in detail herein, the front panel is a FAP. The skilled person will appreciate that, in alternative embodiments, the front panel 400 may not have useful acoustic properties, such as noise attenuation, and may therefore not be classed as a FAP, but may otherwise be arranged in the same manner as disclosed herein.

In the embodiment being described, a forward portion of the second trap door 400 is connected to the metallic insert 100. In the embodiment being described, the forward portion of the second trap door 400 is connected to the second hook 104. In the embodiment being described, the second hook 104 is substantially L-shaped in cross-section.

In alternative embodiments, the forward portion of the second trap door 400 may be connected to a portion of the insert 100 adjacent and rearward of the second hook 104.

In the embodiment being described, the connection is designed to fail when the trap door 400 is struck by a blade or blade part so that the trap door panel 400 can move outward/towards the fan case 21 and allow the failed blade to engage the hook 104. The connection may therefore be described as a frangible connection. In the embodiment being described, the frangible connection is provided by a frangible bolt 412 passing through the second hook 104 and through a connection region 410 (e.g. an attachment flange 410) of the trap door 400. The strength of the frangible bolt 412 is selected according to the minimum impact force for which the trap door 400 is designed to open.

In the embodiment being described, the first trap door 200 is around 150% of the length of the second trap door 400. The skilled person will appreciate that absolute trap door size is likely to depend upon the engine size and fan case 21 size and shape, and for example the blade running position as the fan track liner trap door 200 is arranged to act as an abradable surface for tip clearance control in the embodiments being described.

Relative trap door size may also be a function of engine and fan case size and shape, and may be constrained by the position of the hooks 102, 104 and other factors such as the blade running position. In the embodiment being described, the FAP trapdoor 400 is constrained in length to fit between the two hooks 102, 104.

In the embodiment shown in FIG. 4, the fan case 21 comprises a front flange 21c extending outwardly around the circumference of the fan case's front edge. In alternative embodiments, such as that shown in FIG. 5, the fan case 21 may not have a front flange 21c and a front flange 106 may instead be provided by the metallic insert 100.

Figure 5:
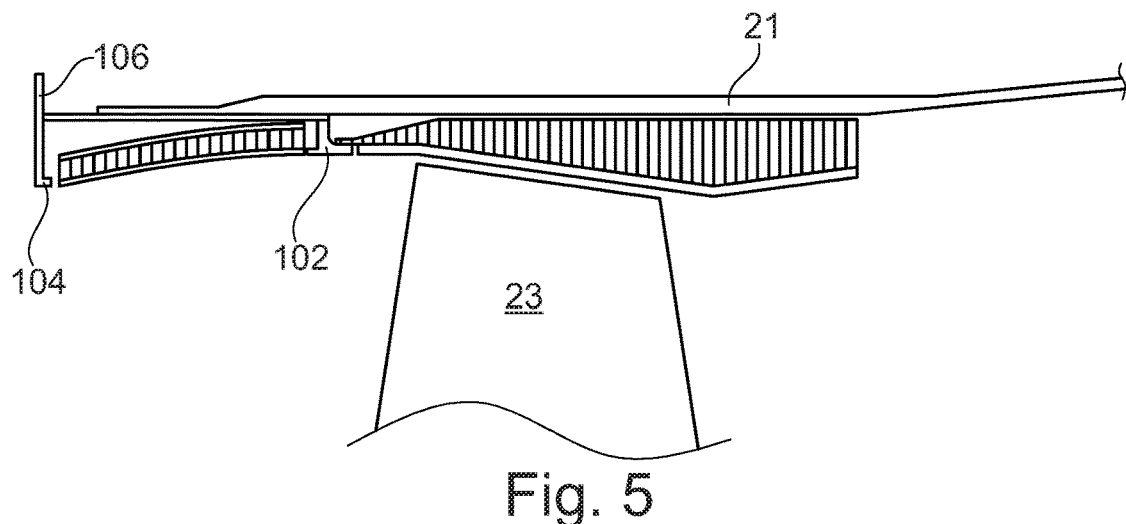
FIG. 5 is a sectional side view of a part of a different fan blade containment system in place around a fan, with the metallic insert providing a front flange for the fan case.

In the embodiment shown in FIG. 5, the fan case 21 is shorter than that shown in FIG. 4 and the metallic insert 100 is the same length as that shown in FIG. 4. The metallic insert 100 of the embodiment shown in FIG. 5 effectively provides an extension to the fan case 21.

In the embodiment shown in FIG. 5, a wall 106 extends outwardly, and in particular radially outwardly, from the front edge region of the metallic insert 100 so as to provide the front flange 106. In the embodiment being described, the front flange 106 is coplanar with the wall 104a of the second hook 104, and the second hook 104 is forward of a forward edge of the fan case 21. In alternative embodiments, the wall 106 may be offset from the second hook 104. In alternative or additional embodiments, the wall 106 may be curved instead of straight.

In alternative embodiments, an insert 100 with a front flange 106 may be used with a fan case 21 with a front flange 21c. In such embodiments, the front flanges 106, 21c may be arranged to make contact such that (i) the metallic front flange 106 protects and reinforces the composite front flange 21c, and/or (ii) the alignment of the flanges assists in inserting the insert 100 into the fan case 21 at the correct angle and/or to the correct depth.

In the embodiments shown in FIGS. 4 to 6, the first and second hooks 102, 104 are long enough to accommodate the width of the front acoustic panel 400 between the lips 102b, 104b of the hooks and the base 100a of the insert 100/the fan case 21. In the embodiments shown in FIGS. 4 to 6, the second hook 104 is longer than the first hook 102 to accommodate the inward angle or curve of the front acoustic panel (FAP) 400. In these embodiments, a lower/inner region of the FAP 400 is connected to each hook at a lower/inner region thereof such that the FAP 400 lies at least substantially within the insert 100.

Figure 7:
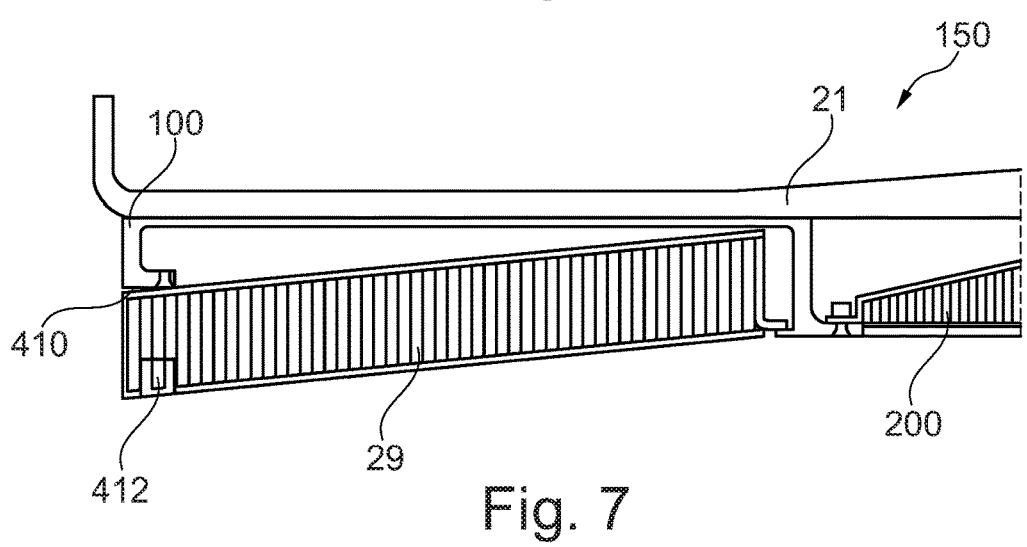
FIG. 7 is a sectional side view of a part of a different fan blade containment system, with the front acoustic panel positioned below the metallic insert.

In the embodiment shown in FIG. 7, the FAP 29 is not arranged as a trap door 400. The FAP 29 is connected below the second hook 104 in its front region and between the first hook 102 and the base/fan case 21 in its rear region. The second hook 104 is shorter than the first hook 102 in this embodiment, as the first hook 102 has to be long enough to accommodate the depth of the FAP 29, whereas the second hook 104 does not. In the embodiment shown in FIG. 7, the FAP 29 is arranged to be broken or penetrated by blade debris, so as to allow access to the second hook 104.

The FAP 29 is again angled downwards from rear to front in the embodiment shown in FIG. 7. The skilled person will appreciate that this angle of the FAP 29, as for that of FAP trap doors 400 of other embodiments, may be set by aerodynamic considerations for the intake, for example a desire to slow the airflow into the engine 10. For the FAP 29, 400, aerodynamic considerations the FAP surface profile may be selected to fit a determined three dimensional (3D) aerodynamic surface. In embodiments in which the FAP 29, 400 is shorter, or in which the determined aerodynamic surface is at least substantially parallel to the axis in the region of the FAP 29, 400, the FAP 29, 400 may not be angled (see e.g. FIG. 20 for an example of a FAP 1400 which is not inwardly angled).

For embodiments including a fore hook 104, hook height may correspondingly be adjusted to fit the 3D aerodynamic surface. The skilled person will appreciate that varying the axial position of the hook 104 around the circumference of the fan case 21 may also be used to fit the 3D aerodynamic surface.

In the embodiment shown in FIG. 7, the FAP 29 is designed to give way (being locally penetrated or breaking) when struck with sufficient force by a released blade or blade part so as to allow the second hook 104 to engage the blade or blade part. The second/front hook 104 is between the FAP 29 and the fan case 21 in the embodiments being described, and may be hidden behind the FAP 29 in normal operation (with the wall 104a optionally visible in a front view).

The skilled person will appreciate that the FAP 29 (or FAP trap door 400) may be deliberately weakened, as discussed below, to reduce the force required for the FAP trap door 400 to move or break, or for the FAP 29 to break, so allowing or facilitating engagement of the second hook 104.

In the embodiment shown in FIG. 7, the first trap door 200 is therefore the only trap door of the insert 100.

Figure 8A:
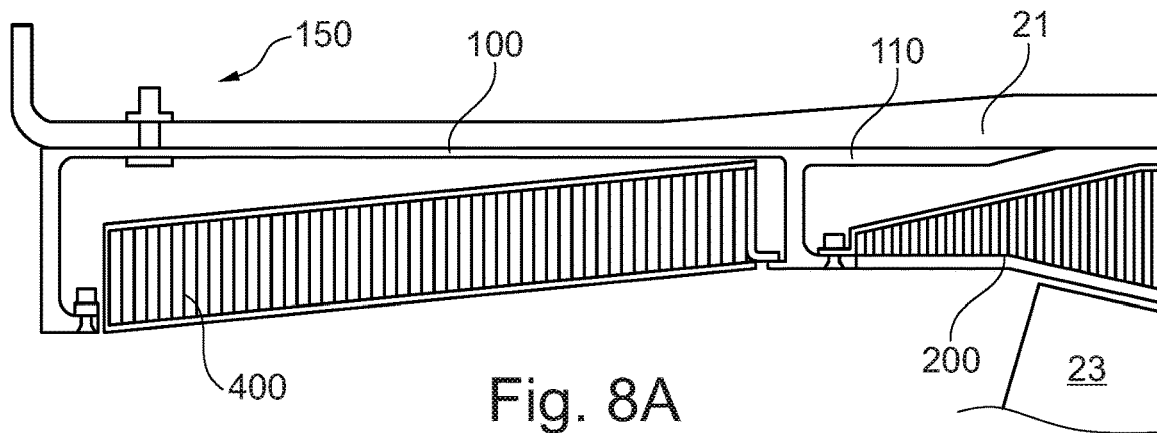
FIG. 8A is a sectional side view of a part of a different fan blade containment system in place around a fan, with the metallic insert extending further into the fan case.
Figure 8B:
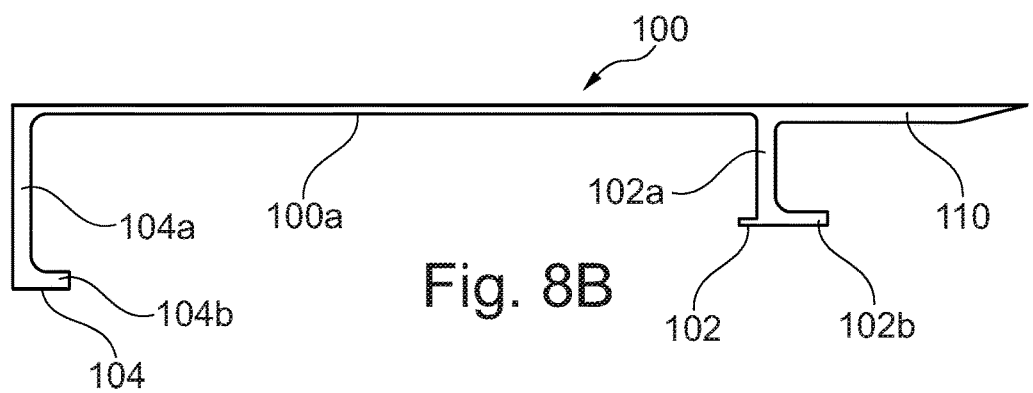
FIG. 8B is a sectional side view of the metallic insert of FIG. 8A.

The embodiment shown in FIGS. 8A and 8B is similar to that shown in FIGS. 4 and 6, but the metallic insert 100 additionally comprises a protection portion 110. The protection portion 110 is an extension of the base portion 100a of the insert 100, extending rearward from the aft hook 102. In embodiments with only a fore hook 104, the protection portion 110 would extend rearward from the fore hook 104.

The protection portion 110 of the embodiment shown in FIGS. 8A and 8B lies between the fan track liner 200 and the fan case 21, protecting the fan case 21 from any impacts in that region should the fan track liner 200 be moved or broken. In the embodiment shown, the protection portion 110 is thicker than the rest of the base portion 100a near the aft hook 102, and tapers to an end. In alternative embodiments, the protection portion 110 may be the same thickness as, or thinner than, the rest of the base portion 100a, and/or may not have a tapered end. The skilled person will appreciate that the region 21a of the fan case 21 adjacent the blade tips 23 may be most likely to receive the most forceful impacts in blade-off events, and that the insert 100 may be replaced when damaged without needing to replace the fan case 21 if the fan case 21 has not been damaged.

Figure 9A:
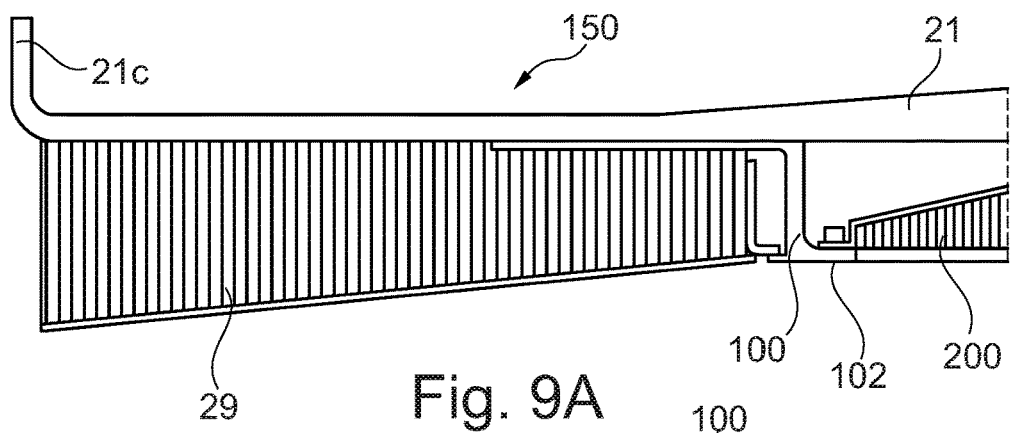
FIG. 9A is a sectional side view of a part of a different fan blade containment system, with the metallic insert comprising only one hook and one trap door.
Figure 9B:
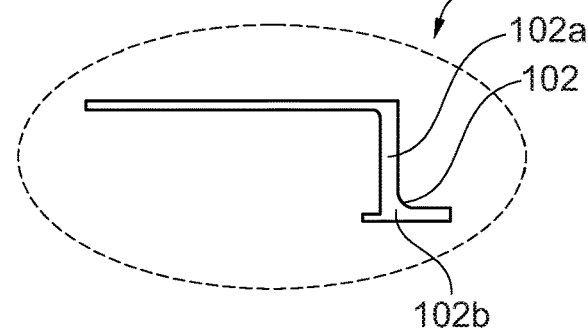
FIG. 9B is a sectional side view of the metallic insert of FIG. 9A.

In the embodiment shown in FIGS. 9A and 9B, the metallic insert 100 comprises only a single hook 102. The single hook 102 corresponds to the aft hook 102 of the embodiments with two hooks described above, and is located adjacent and forward of the blade tips.

The front acoustic panel (FAP) 29 is not a trap door in the embodiment shown in FIG. 9A. The FAP 29 is mounted on the fan case 21 in its forward region and to the metallic insert 100 in its rearward region. The FAP 29 decreases in height from front to rear to provide an angled surface in the embodiment shown; in alternative or additional embodiments, the FAP 29 may be angled with respect to the fan case 21 and may have a constant height.

In the embodiment shown in FIG. 9A, the fan track liner 200 is arranged as a trap door. The fan track liner 200 is mounted on the fan case 21 in its rearward region and to the metallic insert 100, and in particular to the hook 102, in its forward region. The mounting to the hook 102 is frangible to facilitate movement of the trap door 200 when struck. In the embodiment being described, the trap door 200 reduces in height from rear to forward regions such that there is space 200a between the forward region and the fan case 21 to allow space for movement of the trap door 200 when struck. In alternative embodiments, the fan track liner 25 may not be a trap door.

As illustrated in FIGS. 8B and 9B, the metallic insert 100 is provided as a single component in the embodiments being described. In alternative embodiments, the insert 100 may be provided as multiple portions or segments, which may be conjoined. The skilled person will appreciate that, in embodiments with a segmented insert 100, features for load transfer may be incorporated to distribute load on the insert 100. For example, the segments may overlap.

Figure 10:
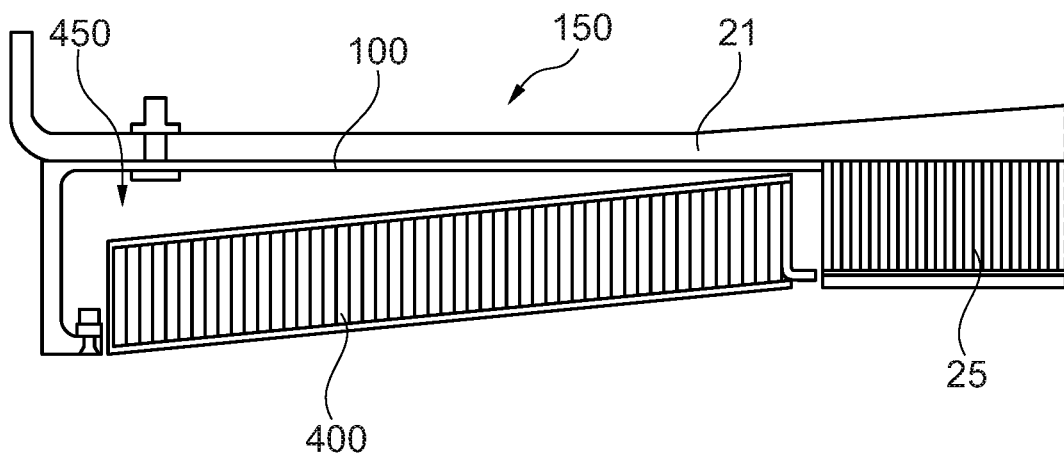
FIG. 10 is a sectional side view of a part of a different fan blade containment system, with the metallic insert comprising only one hook and one trap door.

In the embodiment shown in FIG. 10, the metallic insert 100 comprises only a single hook 104. The single hook 104 corresponds to the fore hook 104 of the embodiments with two hooks described above, and is located spaced from and forward of the blade tips, and at or near a front edge of the fan case 21.

In the embodiment shown in FIG. 10, the front acoustic panel (FAP) 400 is arranged as a trap door. The FAP 400 is mounted on the metallic insert 100 in its forward and rearward regions in the embodiment shown; in alternative embodiments, the FAP 400 may be mounted on the fan case 21 in its rearward region. The FAP 400 is angled from front to rear to provide an angled surface, and to provide a space between the FAP 400 and the fan case 21 in its forward region, to facilitate upward/outward movement of the FAP 400 when struck. The mounting to the hook 104 is frangible in this embodiment to facilitate movement of the trap door 400 when struck. In alternative embodiments, the FAP 29 may not be a trap door.

In the embodiment shown in FIG. 10, the fan track liner 25 is not a trap door. The fan track liner 25 is mounted on the fan case 21. In the embodiment being described, the fan track liner 25 has a constant height from rear to forward region and there is no space between the forward region and the fan case 21.

Figure 11:
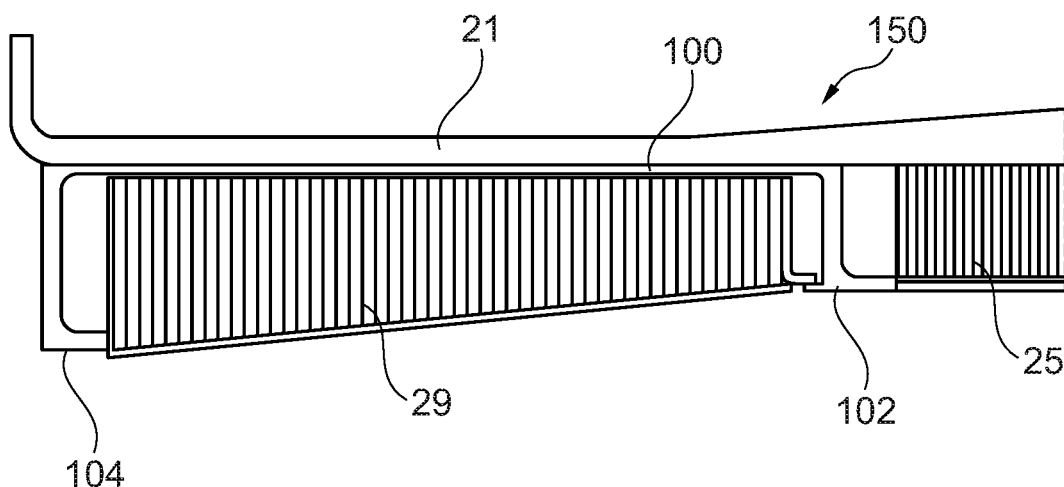
FIG. 11 is a sectional side view of a part of a different fan blade containment system, with the metallic insert comprising two hooks and no trap doors.

In the embodiment shown in FIG. 11, the insert 100 has two hooks 102, 104 but no trap doors. The FAP 29 and fan track liner 25 are not arranged to act as trap doors; instead, a blade 23 or blade part striking either must penetrate or break the FAP 29 or fan track liner 25 to engage the hook 102, 104. As there is no gap between the fan track liner 25 or FAP 29 and the fan case 21, compression of the material may also be required to allow the hook 102, 104 to be engaged. The skilled person will appreciate that the FAP 29 and fan track liner 25 may accordingly be designed to have a lower strength/to be softer than in embodiments in which they are arranged as trap doors 200, 400.

Figure 12A:
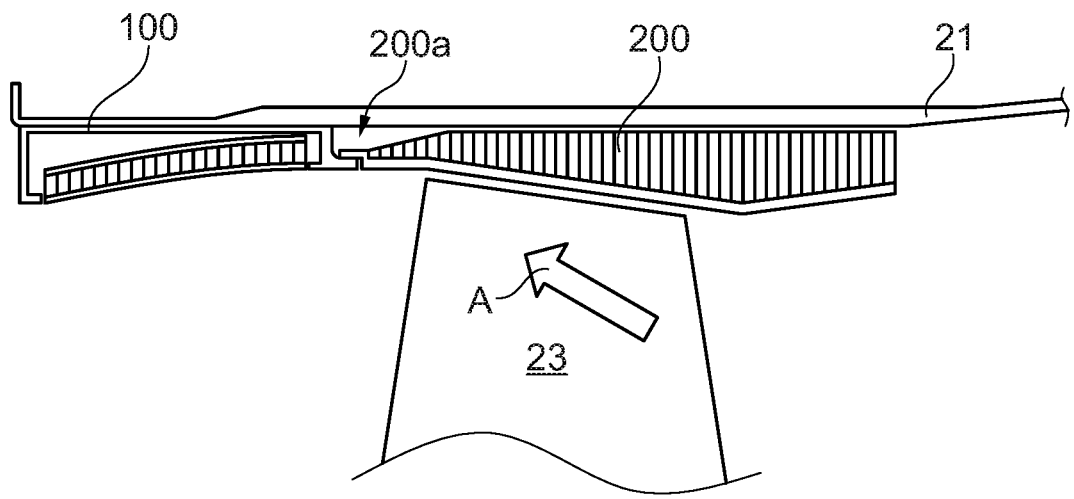
FIGS. 12A and 12B illustrate the interaction of a released blade with the containment system of an embodiment in a fan blade off event.
Figure 12B:
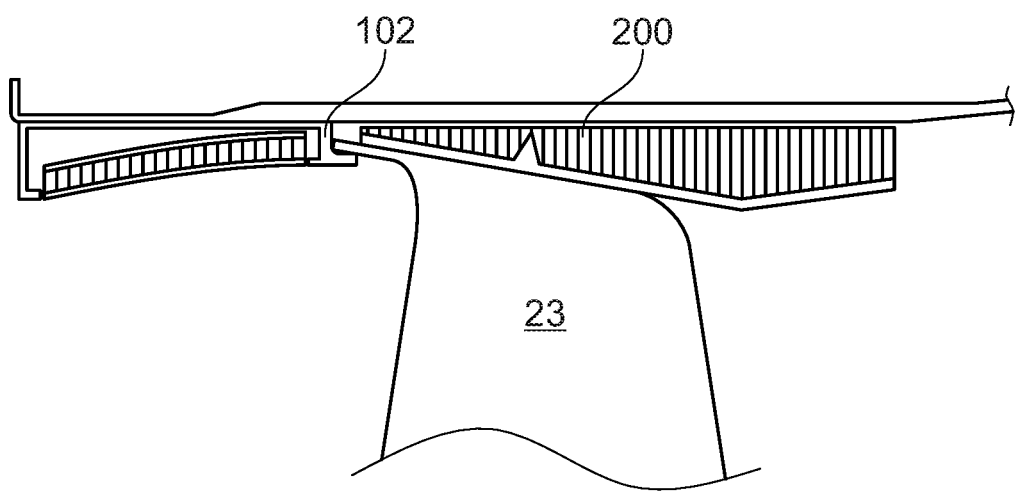

FIGS. 12A and 12B illustrate the interaction of a failed blade 23 with a blade containment system 150 of the embodiment shown in FIGS. 4 and 6. The skilled person will appreciate that equivalent principles would apply to other embodiments.

The blade 23 moves in the direction indicated roughly by arrow A in FIG. 12A on detachment from the fan hub.

As shown in FIG. 12B, the tip of the fan blade 23 hits the trap door 200, damaging the fan track liner/trap door panel 200 such that it breaks or bends into the space 200a in its front region. The released blade tip is captured by the hook 102 as the blade bends against the liner surface 200.

The skilled person will appreciate that, in embodiments without trap doors (or at least without the aft trap door 200 for an impact as shown), the blade 23 may instead be arranged to penetrate the liner 25 (or acoustic panel 29 for impacts further forward in the fan case 21) so as to engage the hook 102 (or hook 104 for impacts further forward in the fan case 21).

Front panel trap doors 400 are now discussed in more detail. The skilled person will appreciate that, although front panel trap doors 400 are primarily discussed herein in relation to a metallic inset 100 on a composite fan case 21, in alternative embodiments no insert 100 may be used (the trap door 400 may be mounted directly onto the fan case 21 and the debris retainer(s) 102, 104 may be provided by a part of the fan case 21), and/or the fan case may be a metallic fan case 21 or a composite-metal hybrid fan case 21. The skilled person will appreciate that, although front panel trap doors 400 are primarily discussed herein in relation to front acoustic panel (FAP) trap doors, in alternative embodiments the panel may not be an acoustic panel.

The skilled person will appreciate that there is generally less design freedom for fan track liner trap doors 200 than for front panel trap doors 400 as a surface of the fan track liner 200 adjacent the blade tips 23 is generally arranged to be abradable to accommodate tip rub.

The FAP trap doors 400 of the embodiments being described are arranged to move (e.g. bend or pivot) and/or break (e.g. shear, crack or split) when stuck by debris such as a blade or blade part 23 so as to allow or facilitate debris engaging a debris retainer such as the fore hook 104 or fence 104a. The trap door FAP 400 may in particular allow or facilitate the capture of trailing blade debris, particularly leading edge metalwork.

In the embodiments being described, the FAP 400 comprises a honeycomb core 402 sandwiched between two facing sheets 404, 406. A first facing sheet 404, referred to as a face sheet 404, is arranged to form an inner surface of the FAP 400 and to be exposed to released blades or blade parts 23. The face sheet 404 is visible in use in the embodiments being described. A second facing sheet 406, referred to as a backing sheet 406, is arranged to form an outer surface of the FAP 400 and to face the fan case 21. The backing sheet 406 is not visible in use in the embodiments being described. In the embodiments being described, the mechanism(s) by which the trap door 400 may operate may exploit the potential failure modes of honeycomb sandwich panels 400.

In the embodiments being described, the honeycomb core 402 is made of an aluminium honeycomb or a Nomex® Aramid honeycomb. The skilled person will appreciate that the core material may be selected based on its noise attenuating properties, when the panel 400 is a FAP 400, and that any suitable material known in the art may be used in other embodiments.

In the embodiments being described, the facing sheets 404, 406 are made of a composite material and may be described as composite facing sheets 404, 406. For example, the backing sheet 406 may be made from a glass-reinforced polymer or carbon-fibre reinforced polymer and the face sheet 404 may be made from a glass-reinforced polymer or glass-fibre reinforced polymer.

In the embodiments being described, both facing sheets 404, 406 are perforated for noise attenuation. In alternative embodiments, only one of the facing sheets 404, 406 (e.g. face sheet 404) may be perforated, or neither sheet may be perforated. In the embodiments being described, the FAP 400 is arranged to move or break under fan blade-off event (FBO) debris load, but not to fail for other load requirements (e.g. ice impact, maintenance crew step, etc.). The FAP 400 of the embodiments being described is arranged to move or break when load on the front acoustic panel 400 meets or exceeds a set threshold. The threshold is set based on knowledge of fan blade-off (FBO) event debris loads in the embodiments being described. Knowledge of likely impact angles may also be used.

In the embodiments described below, the FAP 400 is arranged to move or break according to one or more of the following mechanisms:

- failure of the backing sheet 406 at a specific load threshold selected to allow the FAP 400 to fail under the FBO debris load but not fail for other loads;
- failure of the face sheet 404 at a specific load threshold selected to allow the FAP 400 to fail under the FBO debris load but not fail for other loads;
- failure of the honeycomb core 402 at a specific load threshold selected to allow the FAP 400 to fail under the FBO debris load but not fail for other loads;
- penetration of the face sheet 404 by the debris, which may comprise local penetration of the FAP 400 without the whole FAP structurally failing under the FBO debris load;
- failure of one or more retainers 412, 410 of the FAP 400 at or near a forward edge of the FAP 400 (furthermost end of the FAP 400 from the fan blades 23), allowing the FAP 400 to move to an open position under debris impact and expose the hook 104; and
- mounting the FAP 400 at or near a rearward edge of the FAP (closest end of the FAP 400 to the fan blades 23) such that the FAP 400 can bend or pivot outward at its forward edge (e.g. in a cantilever arrangement) under the FBO debris load.

The skilled person will appreciate that each mechanism type listed above may have a set activation threshold; i.e. a minimum load at which the mechanism occurs. The threshold may be the same for each mechanism, or may vary between mechanisms. For example, a relatively low-load impact, such as for a part-blade 23 at a relatively low speed, may cause a cantilevered FAP 400 to bend without penetrating the FAP 400, whereas a higher-load impact may additionally penetrate the FAP 400, so allowing some of the energy of the impact to be absorbed before engagement of the hook 104.

The skilled person will appreciate that any FAP 400 may fail if struck with a sufficient force, but that providing one or more weaknesses allows the mechanism of the failure to be controlled, and allows the FAP 400 to fail in a controlled manner for lower impact forces.

Various embodiments are described below, with reference to FIGS. 13 to 19.

In the embodiments being described, the debris retainer 104 arranged to engage debris striking the FAP trap door 400 is a fore hook 104 as described above. In alternative embodiments, the debris retainer may be different, for example comprising a fence 104a with no hook (e.g. a wall extending at least substantially inward from the fan case 21).

Figure 13:
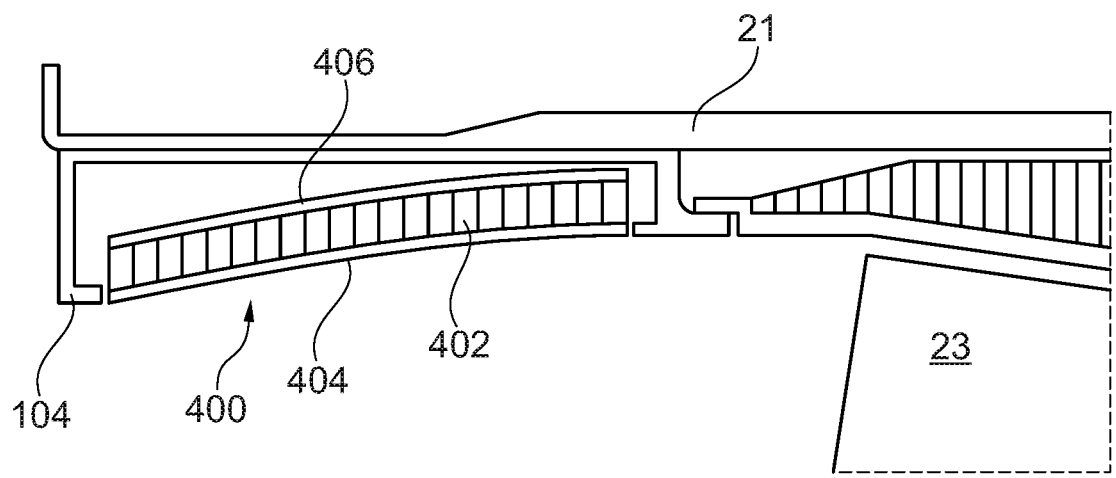
FIG. 13 is a close-up view of a portion of FIG. 5.

FIG. 13 shows a FAP trap door 400 in situ within a fan case 21.

Figure 14:
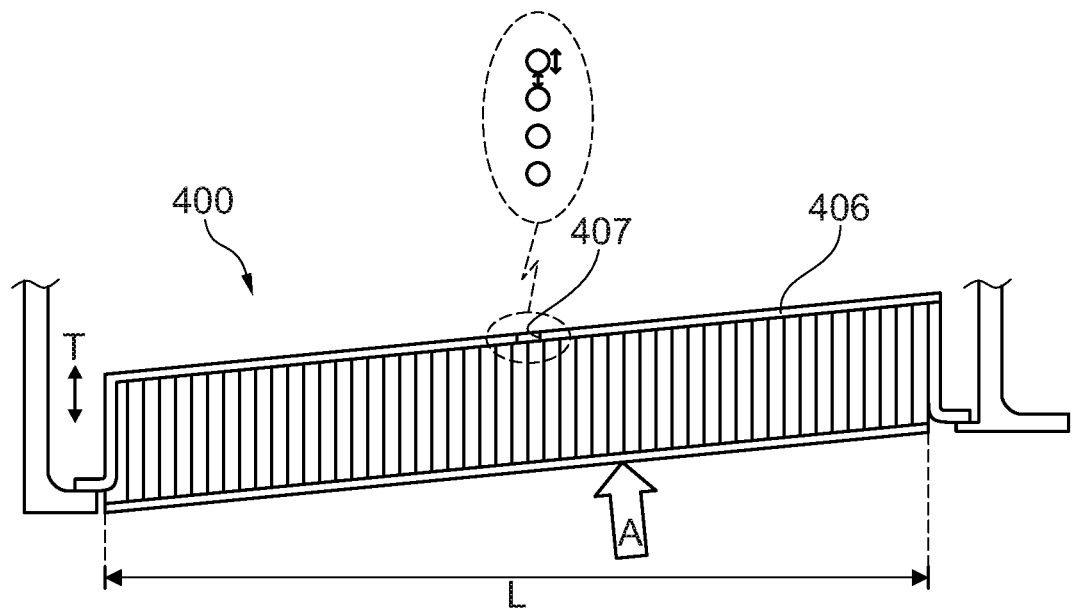
FIG. 14 illustrates a front acoustic panel (FAP) trap door with a backing sheet arranged to fail on impact.

The FAP trap door 400 of FIG. 14 comprises a backing sheet 406 arranged to fail in tension at a specific load threshold that allows the FAP to fail under the FBO debris load. Arrow A illustrates a possible impact force from debris striking the FAP 400.

In the embodiment being described the backing sheet 406 comprises a plurality of holes 407. The holes 407 are arranged to weaken the backing sheet 406 so that it fails at the specific load threshold chosen.

In the embodiment being described, the holes 407 are between 2 mm and 10 mm in diameter, and more specifically around 3 mm in diameter.

In the embodiment being described, the holes 407 are at least substantially circular. In alternative or additional embodiments, the holes 407 may be differently shaped, for example being elongate, and/or comprising one or more sharp angles which may facilitate crack propagation through the backing sheet 406.

In the embodiment being described, the holes 407 are arranged in a circumferential line. In alternative or additional embodiments, the holes 407 may be arranged in multiple circumferential lines at different axial positions, may be arranged in axial lines, may be randomly scattered, and/or may be differently arranged.

In the embodiment being described, a spacing between adjacent holes 407 is at least substantially equal to hole diameter. In alternative or additional embodiments, hole spacing and/or hole size may vary between holes, and/or a ratio between hole spacing and hole size may differ.

The holes 407 may be punched or drilled into the backing sheet 406.

The backing sheet 406 of the embodiment being described has a thickness, T, and a span, L.

In alternative or additional embodiments, the thickness (T) of the backing sheet 406 may be selected such that the backing sheet 406 will fail when struck with a force equal to or greater than a set threshold. The skilled person will appreciate that the span (L) may also have an effect on the force of impact necessary to break the FAP 400, and that a ratio of T/L may therefore be controlled accordingly to match the threshold.

In some embodiments, the backing sheet 406 may be tapered along the unsupported span, L, of the FAP 400, for example being thinnest in its middle region. The backing sheet 406 may for example have a width of around 3 mm in its edge regions, narrowing to around 0.25 mm in its middle region, The FAP trap door 400 of FIG. 15 comprises a face sheet 404 arranged to fail in compression at a specific load threshold that allows the FAP to fail under the FBO debris load. Arrow A illustrates a possible impact force from debris striking the FAP 400.

In the embodiment being described the face sheet 404 comprises a plurality of holes 409. The holes 409 are arranged to weaken the face sheet 404 so that it fails at the specific load threshold chosen.

In the embodiment being described, the holes 409 are between 2 mm and 10 mm in diameter, and more specifically around 3 mm in diameter. The holes 409 may be as for the holes in the backing sheet 406.

In the embodiment being described, the holes 409 are at least substantially circular. In alternative or additional embodiments, the holes 409 may be differently shaped, for example being elongate, and/or comprising one or more sharp angles which may facilitate crack propagation through the face sheet 404.

In the embodiment being described, the holes 409 are arranged in a circumferential line. In alternative or additional embodiments, the holes 409 may be arranged in multiple circumferential lines at different axial positions, may be arranged in axial lines, may be randomly scattered, and/or may be differently arranged.

In the embodiment being described, a spacing between adjacent holes 409 is at least substantially equal to hole diameter. In alternative or additional embodiments, hole spacing and/or hole size may vary between holes, and/or a ratio between hole spacing and hole size may differ.

The holes 409 may be punched or drilled into the face sheet 404.

In embodiments with holes 407, 409 in both the face sheet 404 and the backing sheet 406, the holes 407, 409 and/or lines of holes may be aligned so as to provide one or more lines or points of weakness.

In embodiments with perforated facing sheets 404, 406, the holes 407, 409 may be distinguished from the perforations by size, being larger than the perforations. For example, in the embodiments being described the perforations may have a size of 1-2 mm whereas the holes 407, 409 may have a size of 2-10 mm. The skilled person will appreciate that the holes 407, 409, like the perforations, may contribute to the noise attenuating properties of the panel 400.

In the embodiment being described, the face sheet 404 additionally comprises a wrinkle 403. In the embodiment being described the wrinkle 403 comprises a fold in the face sheet 404, directed outward/toward the fan case 21.

In the embodiment being described, the wrinkle 403 extends into the FAP 400 to a depth of approximately one third of the FAP depth. In various embodiments, the wrinkle 403 may extend into the FAP 400 to a depth of between approximately one tenth and one half of the FAP depth, for example of approximately one quarter of the FAP depth.

In the embodiment being described, the wrinkle 403 extends circumferentially across the surface of the FAP 400. In the embodiment being described the wrinkle 403 extends around the circumference formed by the face sheet 404 so as to form a circle. In alternative embodiments, the wrinkle 403 may have a less regular shape, or may form a spiral or the likes.

The wrinkle 403 is arranged to weaken the face sheet 404 so that it fails at the specific load threshold chosen.

In alternative or additional embodiments, multiple wrinkles 403 may be present, and/or the orientation of the wrinkle(s) 403 may differ.

In alternative embodiments, the face sheet 404 may comprise one or more holes 409 but no wrinkles 403, or one or more wrinkles 403 but no holes 409.

The face sheet 404 of the embodiment being described has a thickness, T, and a span, L. The thickness and span may be different from that of the backing sheet 406.

In alternative or additional embodiments, the thickness (T) of the face sheet 404 may be selected such that the face sheet 404 will fail when struck with a force equal to or greater than a set threshold. The skilled person will appreciate that, as for the backing sheet 406, the span (L) may also have an effect on the force of impact necessary to break the FAP 400, and that a ratio of T/L may therefore be controlled accordingly to match the threshold.

Figure 16:
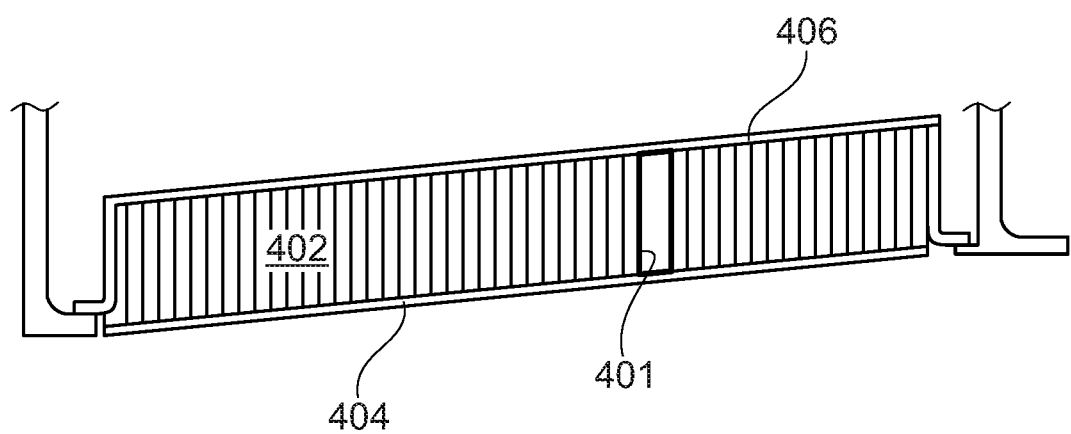
FIG. 16 illustrates a FAP trap door with a core arranged to fail on impact.

In the embodiment shown in FIG. 16, the core 402 comprises a gap 401 therethrough. The gap 401 in the honeycomb core of the FAP 400 is sized and positioned to trigger failure at the set threshold load, and in particular to trigger shear of the panel 400. The gap 401 has a width of between 5 mm and 20 mm, and more specifically of around 12 mm, in the embodiment being described. The gap 401 is positioned around two thirds of the way along the panel 44, front to back, in the embodiment being described. In various embodiments, the gap 401 may be positioned between one quarter and three quarters of the way along the panel 400, front to back.

In the embodiment being described, the honeycomb core 402 comprises a plurality of discrete honeycomb blocks and the gap 401 is a gap between blocks. In the embodiment being described, each block has a width of round 12 mm and the gap 401 is formed by omitting one block. In alternative embodiments, the honeycomb core 402 may be made from a single block and a hole may be made therethrough to create the gap 401. The skilled person will appreciate that the use of multiple blocks in some embodiments may facilitate manufacture.

Figure 15:
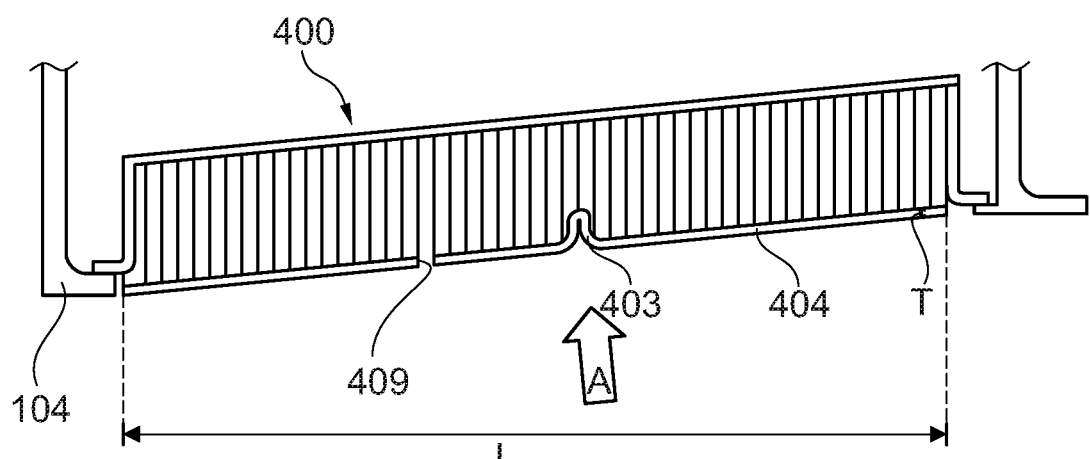
FIG. 15 illustrates a FAP trap door with a face sheet arranged to fail on impact.

In the embodiment shown in FIG. 16, neither of the facing sheets 404, 406 are weakened as for the embodiments shown in FIGS. 14 and 15. The skilled person will appreciate that, in alternative or additional embodiments, one or both of the facing sheets 404, 406 may be weakened as well as the core 402. In such embodiments, the points or lines of weakness in the facing sheet(s) 404, 406 and core 402 may be aligned to facilitate failure of the FAP 400 when an impact meets the load threshold.

In the embodiment shown in FIG. 17, the FAP 400 is arranged to allow debris to penetrate the FAP 400 locally, i.e. in a region in which it strikes the FAP. The FAP 400 as a whole may therefore not move or fail for some FBO impacts and may remain structurally sound. In the embodiment shown in FIG. 17, a gap 450 is provided between the FAP 400 and the fan case 21 to facilitate outward movement of a damaged region of the FAP 400.

In the embodiment being described, a plurality of holes 405 is provided in the face sheet 404. The holes 405 are sized and/or spaced to reduce the local shear resistance capability to a suitable level. The holes 405 may be punched or drilled into the FAP face sheet 404. The holes 409 provided to weaken the face sheet 404 may also facilitate shear—the holes 405, 409 may therefore be the same holes with a dual purpose in some embodiments, depending on core shear properties.

In the embodiment being described, the face sheet 404 comprises two separate portions, separated by a circumferential gap 411; there is a gap 411 where the two portions meet. This may be described as the face sheet 404 comprising a gapped butt joint 411. The skilled person will appreciate that this gapped joint 411 may allow any debris impacting or passing over this region to more easily shear into the panel 400.

In the embodiment shown in FIG. 17, the FAP 400 comprises both a gapped joint and holes. In alternative embodiments, either may be used without the other. Further, either or both of the features 405, 411 provided for local penetration may be used with core 402 and/or facing sheet 404, 406 weakening features as described above, and/or with any of the frangible connectors or cantilever arrangements discussed below.

In the embodiment shown in FIG. 18A, the FAP 400 is detachably connected to the fan case 21 at or near its forward edge, and a gap 450 is provided between a forward region of the FAP 400 and the fan case 21, such that a forward region of the front acoustic panel 400 can move toward the fan case 21 if struck.

In the embodiment shown in FIG. 18A, the detachable connection is provided by a frangible connection 410, 412.

In the embodiment being described, the frangible connection is provided by a bolt 412 passing through the fore hook 104 and through a connection region 410 of the trap door 400. In the embodiment being described, the connection region 410 of the trap door 400 comprises an attachment flange 410. In the embodiment being described, the attachment flange 410 extends axially forward from an inner front region of the trap door 400.

In the embodiment being described, the attachment flange 410 extends around the circumference. In alternative embodiments, multiple discrete attachment flanges 410 may be provided around the circumference, or only a single attachment flange 410 may be provided, In the embodiment being described, bolts 412 are placed at regular intervals. In alternative embodiments, only one bolt 412 may be provided or the bolts 412 may be irregularly spaced.

In the embodiment being described, the bolts 412 are frangible and arranged to fail at the threshold load set for debris interaction on the FAP 400. In the embodiment being described, the bolts 412 are made of aluminium or a composite material. The strength of the frangible bolt 412 is selected according to the minimum impact force for which the trap door 400 is designed to move/open. The skilled person will appreciate that substituting a frangible bolt 412 with a first breaking strength for a frangible bolt with a second, different, breaking strength may allow a different set threshold to be implemented with otherwise the same components—i.e. for the same FAP 400 (and optionally the same insert 100, in embodiments with an insert 100).

In alternative or additional embodiments, the nut 413 arranged to secure the bolt 412 (which may be described as an anchor nut 413) may be arranged to pull through the FAP attachment flange 410 at a prescribed load. In such embodiments, the nut 413 may be selected to have a relatively small perimeter—i.e. only slightly larger than that of the shaft of the bolt 412, to facilitate pull-through of the nut 413. The difference in size/overlap of the nut 413 with the attachment flange 410 may be selected based on materials used and the desired breaking strength of the frangible connection.

In the embodiments being described, the FAP attachment flange 410 is arranged to lie above (in the orientation shown in the figures) the lip 104a of the fore hook 104, and the bolt 412 is arranged to extend through the lip 104a and the attachment flange 410. In the embodiments being described, the head of the bolt 412 lies below/seated in a countersunk hole in the lip 104a and the bolt is above the attachment flange 410. For the attachment flange 410 to move upward, the nut 413 may pull through the attachment flange 410. In alternative embodiments, the head of the bolt 412 may lie above/seated in a countersunk hole in the attachment flange 410 and the head of the bolt may lie below the lip 104a. In such embodiments, it may instead be the head of the bolt which pulls through the attachment flange 410. In still further alternative embodiments, a head or nut 413 of the bolt 412 may additionally or alternatively pull through the lip 104a—however, the skilled person will appreciate that weakening the lip 104a may not be desirable in many embodiments.

In alternative or additional embodiments, holes 414 through the attachment flange 410 may be provided to weaken the attachment flange 410 around the retained nut position (or the bolt head position, as appropriate) to allow it to fail at a prescribed load, as shown in FIG. 18B. Size, shape, and/or spacing of the holes 414 may be selected as appropriate. In the embodiment being described, the holes 414 are 2 mm in diameter and spaced 2 mm apart.

In the embodiment being described and shown in FIG. 18B, the hole 410a provided for the bolt 412 to pass through the attachment flange 410 is not rotationally symmetric as the bolt 412 is arranged to be connected thereto using an anchored nut with a locating rivet (not shown)—the hole 410a is shaped to accommodate the locating rivet as well as the shaft of the bolt 412. In alternative embodiments, no locating rivet may be used.

In alternative or additional embodiments, the attachment flange 410 may be weakened by locally thinning the attachment flange 410 around the retained nut (or bolt head) position, for example by dropping plies in the composite laminate when the attachment flange 410 comprises a laminate composite material.

Figure 19:
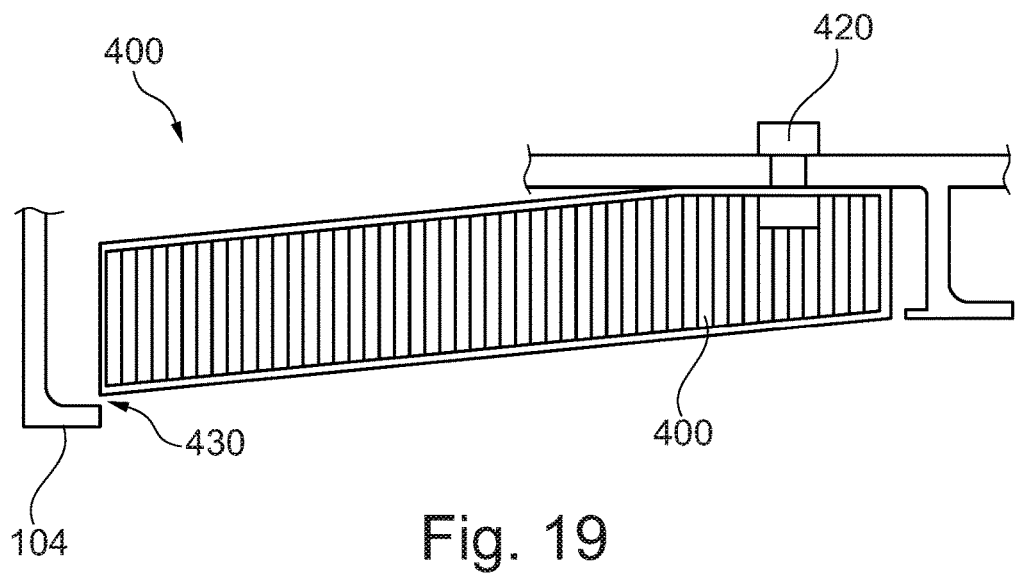
FIG. 19 illustrates a cantilevered FAP trap door arranged to bend on impact.

In the embodiment shown in FIG. 19, the front acoustic panel 400 is cantilevered, with its rearward end region mounted on the fan case 21 and its forward end region unsupported. A rigid connection such as a through-bolt 420 is used to secure the rearward end region of the FAP 400 to the fan case 21, or more particularly to an insert 100 mounted on the fan case 21 in the embodiment shown.

In the embodiment being described, the FAP 400 is arranged such that a forward region of the FAP 400 can bend outward, toward the fan case 21, if struck. A gap 450 is provided between the outer surface of the FAP 400 and the inner surface of the fan case 21 in the embodiment being described, to accommodate the movement of the FAP 400.

In alternative embodiments, the front acoustic panel 400 may be pivotally mounted at or near its rearward edge.

In embodiments in which the front acoustic panel 400 is arranged to bend or pivot, the FAP 400 may be segmented such that a struck segment can bend or pivot without affecting the other segments. The segmentation may be provided by adjacent, optionally overlapping, portions separated parallel to the axis. The separations may be provided by frangible lines such as lines of holes in an axial direction along the FAP 400.

In the embodiment shown in FIG. 19, a gap 430 is provided between a forward edge of the front acoustic panel 400 and the debris retainer 104. In the embodiment being described, the gap 430 is both radial and axial, in that the hook 104 extends inwardly beyond the extent of the FAP 400 and is axially spaced therefrom.

The skilled person will appreciate that the gap 430 exposes the debris retainer 104 to debris traveling forward on or near the surface of the front acoustic panel 400 when the FAP 400 is in its default position (i.e. without any movement or breaking of the panel 400 being required for the hook 104 to be engaged by the debris).

By contrast, in the embodiments discussed with respect to FIGS. 13 to 18, the FAP 400 is connected to the hook 104, blocking access to the fence 104a. In those embodiments, movement or breaking of the FAP 400 is performed for debris to engage the hook 104.

The skilled person will appreciate that such a gap 430 could also be provided in non-cantilevered embodiments; for example, the forward edge region of the FAP 400 could be mounted to a portion of the fan case 21 or insert 100 rearward of the hook 104, or to the fence 104a of the hook rather than the lip 104b such that at least a portion of the fence 104a and the lip 104b are exposed, and/or the height of the FAP 400 could be selected such that the hook 104 extends inwardly beyond the extent of the FAP 400.

Figure 20:
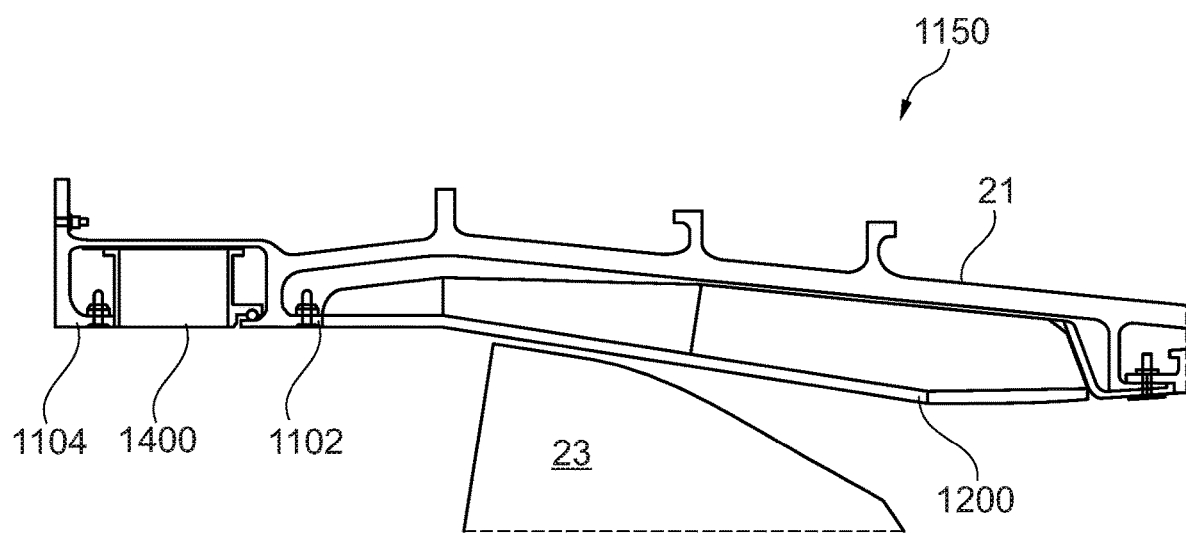
FIG. 20 illustrates a metallic fan case comprising a fan blade containment system with two hooks.

FIG. 20 illustrates an alternative fan blade containment system 1150 in place around a fan 23. The fan blade containment 1150 system comprises two hooks 1102, 1104 arranged as described for the fore and aft hooks 102, 104 of the embodiments described above.

In the embodiment shown in FIG. 20, the fan case 21 and the hooks 1102, 1104 are all metallic. In the embodiment being described, the hooks 1102, 1104 extend from the metallic fan case 21. The hooks 1102, 1104 are integral with the fan case 21 in the embodiment shown in FIG. 20. The hooks 1102, 1104 are formed integrally with the fan case 21 in the embodiment being described; in alternative embodiments, one or both hooks 1102, 1104 may be attached to the fan case 21 (e.g. by welding) instead of being formed integrally therewith.

In the embodiment shown in FIG. 20, each hook 1102, 1104 has a corresponding trap door 1200, 1400 arranged to allow the fan track liner or FAP (respectively) forming the trap door panel 200, 400 to move when or if struck so as to provide access to the hook 1102, 1104 for engagement of the blade 23 or blade part. The panel 200, 400 may pivot, bend, and/or break to move. The skilled person will appreciate that only a portion of the panel 200, 400 may move in some embodiments; for example a forward region thereof.

In alternative embodiments, only one of the hooks 1102, 1104 may have a corresponding trap door 200, 400, or neither hook may have a trap door.

The hooks 1102, 1104 and trap doors 1200, 1400 may have any or all of the features described above, except that a part of the fan case 21 takes the place of the insert 100. Further, the skilled person will appreciate that the role of a base portion 100a and/or protection portion 110 of the insert 100 to support the hooks 102, 104 and/or protect the fan case 21 from impact may be irrelevant for metallic fan cases 21.

The skilled person will appreciate that the debris retainers 1102, 1104 may be sized and positioned as a function of the blade threat, not the fan case material. The positions and sizes of the hooks 1102, 1104 of the embodiment being described are therefore generally equivalent to those of the embodiments described above. Any difference may be due to, for example, the relative ease of implementing hooks 1102, 1104 within a metallic casing 21; for example there may be a reduced requirement for features that fix the hooks 1102, 1104 into the casing 21 or "lead in" to the hook to reduce stiffness or strength discontinuities In the embodiment being described, the hooks 1102, 1104 are machined, for example being formed by machining directly from the casing forging. In some embodiments, one or more ribs or ridges may be provided on the metallic fan case 21 for machining into the desired shape.

In alternative embodiments, hooks 1102, 1104 may be roll formed and secondary welded within the fan case barrel 21, or any other suitable technique known in the art may be used.

In alternative embodiments, a metallic insert 100 as described above could be used with a metallic fan case 21. However, the skilled person will appreciate that forming the hooks 1102, 1104 integrally with the metallic fan case 21, or welding the hooks 1102, 1104 thereto, may be preferred.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fan blade containment system for surrounding a fan comprising a plurality of fan blades in a gas turbine engine for an aircraft, the fan blade containment system comprising:
   a composite fan case; and
   a metallic insert mounted on the composite fan case and comprising:
      a first metallic hook arranged to prevent forward debris release should all or part of one of the plurality of fan blades become detached from the fan when the fan blade containment system is installed in the gas turbine engine;
      a first trap door having a forward edge and a rearward edge, the first trap door being detachably connected to the metallic insert at its forward edge such that a forward region of the first trap door can move toward the fan case if struck when the fan blade containment system is installed in the gas turbine engine; and
      a protection portion that extends in a rearward direction from the first metallic hook and terminates in the rearward direction before reaching the rearward edge of the first trap door.

2. The fan blade containment system of claim 1, wherein the metallic insert is mounted on the composite fan case by means of an adhesive layer arranged to account for differences in Coefficient of Thermal Expansion between the metallic insert and the composite fan case.

3. The fan blade containment system of claim 1, wherein the metallic insert further comprises a second metallic hook, the second metallic hook being located forward of the first metallic hook.

4. The fan blade containment system of claim 3, wherein the metallic insert further comprises a second trap door located forward of the first metallic hook and having a forward edge and a rearward edge, the second trap door being detachably connected to the metallic insert at its forward edge such that a forward region of the second trap door can move toward the fan case if struck when the fan blade containment system is installed in the gas turbine engine.

5. The fan blade containment system of claim 4, wherein the second trap door is arranged to be detachably connected to the second metallic hook at the forward edge of the second trap door.

6. The fan blade containment system of claim 4, wherein the second trap door is arranged to be detachably connected to the metallic insert by a frangible connector, the frangible connector being arranged to break in response to pressure applied by a released blade or blade fragment when the fan blade containment system is installed in the gas turbine engine.

7. The fan blade containment system of claim 4, wherein the second trap door extends from forward of the first metallic hook to adjacent the second metallic hook and is configured to facilitate the detached all or part of the one of the plurality of fan blades engaging the second metallic hook when the fan blade containment system is installed in the gas turbine engine.

8. The fan blade containment system of claim 3, wherein the second metallic hook is arranged to arrest forward motion of the detached all or part of the one of the plurality of fan blades when the fan blade containment system is installed in the gas turbine engine.

9. The fan blade containment system of claim 3, wherein the second metallic hook is located between 10 cm and 50 cm forward of the first metallic hook.

10. The fan blade containment system of claim 3, wherein the second metallic hook is located at a forward edge of the fan case.

11. The fan blade containment system of claim 3, wherein at least one of the first metallic hook and the second metallic hook comprises a fence extending around an internal circumference of the fan case, the fence extending inwardly from the fan case.

12. The fan blade containment system of claim 11, wherein at least one of the first metallic hook and the second metallic hook comprises a lip extending rearwardly from the fence, the lip extending circumferentially and spaced inwardly from the fan case.

13. The fan blade containment system of claim 12, wherein the lip of either or both of the first metallic hook and the second metallic hook extends axially rearwardly.

14. The fan blade containment system of claim 12, wherein the lip of either or both of the first metallic hook and the second metallic hook extends rearwardly from an inward end region of the corresponding fence.

15. The fan blade containment system of claim 12 wherein the lip of either or both of the first metallic hook and the second metallic hook extends rearwardly from the corresponding fence by between 3 mm and 10 mm.

16. The fan blade containment system of claim 11 wherein the fence of either or both debris retainers extends inwardly from the fan case by between 40 mm and 60 mm.

17. The fan blade containment system of claim 11, wherein the fence of either or both of the first metallic hook and the second metallic hook extends radially inward from the fan case.

18. The fan blade containment system of claim 1, wherein the metallic insert is arranged to be mounted on an inner surface of the composite fan case.

19. The fan blade containment system of claim 1, wherein the first trap door is arranged to be detachably connected to the first metallic hook at the forward edge of the first trap door.

20. The fan blade containment system of claim 1 wherein the first trap door is arranged to be detachably connected to the metallic insert by a frangible connector, the frangible connector being arranged to break in response to pressure applied by a released blade or blade fragment when the fan blade containment system is installed in the gas turbine engine.

21. The fan blade containment system of claim 1, wherein the metallic insert is mounted by one or more through-case fasteners.

22. A gas turbine engine for an aircraft comprising:
a fan comprising a plurality of fan blades; and
a fan blade containment system according to claim 1 surrounding the fan.

23. The fan blade containment system of claim 1, wherein the first metallic hook is configured to be located between 1 cm and 15 cm forward of leading edge tips of the fan blades when the fan blade containment system is installed in the gas turbine engine.

24. The fan blade containment system of claim 1, wherein the first trap door extends from rearward of the fan to adjacent the first metallic hook and is configured to facilitate the detached all or part of the one of the plurality of fan blades engaging the first metallic hook when the fan blade containment system is installed in the gas turbine engine.

25. A metallic insert for mounting on a composite fan case surrounding a fan comprising a plurality of fan blades in a gas turbine engine for an aircraft, the metallic insert comprising:
a first metallic hook arranged to prevent forward debris release should all or part of one of the plurality of fan blades become detached from the fan when the metallic insert is mounted on the composite fan case;
a first trap door having a forward edge and a rearward edge, the first trap door being detachably connected to the metallic insert at its forward edge such that a forward region of the first trap door can move toward the fan case if struck when the metallic insert is mounted on the composite fan case; and
a protection portion that extends in a rearward direction from the first metallic hook and terminates in the rearward direction before reaching the rearward edge of the first trap door.

26. The metallic insert of claim 25, further comprising:
a second metallic hook arranged to prevent forward debris release should all or part of a fan blade become detached from the fan when the metallic insert is mounted on the composite fan case, the second metallic hook being located forward of the first metallic hook.

27. The metallic insert of claim 26, further comprising a second trap door located forward of the first metallic hook and having a forward edge and a rearward edge, the second trap door being detachably connected to the metallic insert at its forward edge such that a forward region of the second trap door can move toward the fan case if struck when the metallic insert is mounted on the composite fan case.

28. The metallic insert of claim 25, further comprising a first trap door having a forward edge and a rearward edge, the first trap door being detachably connected to the metallic insert at its forward edge such that a forward region of the first trap door can move toward the fan case if struck when the metallic insert is mounted on the composite fan case.

* * * * *